(12) United States Patent
Otsubo et al.

(10) Patent No.: US 10,121,569 B2
(45) Date of Patent: Nov. 6, 2018

(54) CABLE AND EXPLOSION-PROOF SYSTEM

(71) Applicant: KABUSHIKI KAISHA YASKAWA DENKI, Kitakyushu-shi (JP)

(72) Inventors: Naoyuki Otsubo, Kitakyushu (JP); Tsuyoshi Ito, Kitakyushu (JP); Kazunori Yamamoto, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/684,963

(22) Filed: Aug. 24, 2017

(65) Prior Publication Data

US 2018/0061527 A1   Mar. 1, 2018

(30) Foreign Application Priority Data

Aug. 31, 2016 (JP) .................................. 2016-170345

(51) Int. Cl.
| | | |
|---|---|---|
| *H01B 7/285* | (2006.01) | |
| *H01B 7/18* | (2006.01) | |
| *H01B 13/22* | (2006.01) | |
| *H01B 3/40* | (2006.01) | |

(52) U.S. Cl.
CPC .......... *H01B 7/285* (2013.01); *H01B 7/1875* (2013.01); *H01B 13/221* (2013.01); *H01B 3/40* (2013.01)

(58) Field of Classification Search
CPC ..... H01B 7/285; H01B 7/1875; H01B 13/221
USPC .................................................... 174/70 R
See application file for complete search history.

(56) References Cited

U.S. PATENT DOCUMENTS

| | | | | | |
|---|---|---|---|---|---|
| 3,615,960 | A | * | 10/1971 | Hoshii | C08G 59/40 156/158 |
| 4,201,005 | A | * | 5/1980 | Hunt | G09F 13/06 362/267 |
| 5,949,209 | A | * | 9/1999 | Okamoto | B25J 19/0079 174/17 GF |
| 2010/0108020 | A1 | * | 5/2010 | Miretti | H02G 3/0675 123/198 D |
| 2014/0295710 | A1 | * | 10/2014 | Inagaki | H01R 13/5216 439/660 |

FOREIGN PATENT DOCUMENTS

JP          2014-3128          1/2014

* cited by examiner

*Primary Examiner* — Timothy Thompson
*Assistant Examiner* — Charles Pizzuto
(74) *Attorney, Agent, or Firm* — Mori & Ward, LLP

(57) ABSTRACT

A cable includes electric wires, an outer cover, a first cover, and a second cover. Each of the electric wires includes a conductive core and an insulator covering the conductive core. The outer cover covers the electric wires and extends from a first atmosphere to a second atmosphere less explosive than the first atmosphere. An outer surface of the outer cover is supported by a partition separating the first atmosphere from the second atmosphere. The first cover includes a thermosetting resin and covers an exposed portion of the electric wires, which is not covered by the outer cover in the second atmosphere. The second cover covers the first cover and includes a material higher in fracture strength than the thermosetting resin.

20 Claims, 14 Drawing Sheets

CABLE AND EXPLOSION-PROOF SYSTEM

CROSS-REFERENCE TO RELATED APPLICATIONS

The present application claims priority under 35 U.S.C. § 119 to Japanese Patent Application No. JP2016-170345, filed Aug. 31, 2016. The contents of this application are incorporated herein by reference in their entirety.

BACKGROUND

Field of the Invention

The embodiments disclosed herein relate to a cable and an explosion-proof system.

Discussion of the Background

Robots and other machines that serve purposes such as coating are exposed to explosive atmospheres during operation. These machines operate on power and communication signals supplied through a cable from a power source and other devices disposed in a non-explosive area isolated from the explosive atmosphere. In order to stand explosive atmospheres, these machines are implemented as explosion-proof machines with non-explosive internal atmospheres. For example, nonflammable gas such as nitrogen is filled inside the machines to increase the internal pressure.

If a fire occurs in the explosion-proof machine or the non-explosive area, the fire may spread to the explosive atmosphere through the cable. In light of this possibility, JP2014-003128A1 discloses a support for the cable to prevent a fire from spreading through the cable.

SUMMARY

According to one aspect of the present disclosure, a cable includes electric wires, an outer cover, a first cover, and a second cover. Each of the electric wires includes a conductive core and an insulator covering the conductive core. The outer cover covers the electric wires and extends from a first atmosphere to a second atmosphere less explosive than the first atmosphere. An outer surface of the outer cover is supported by a partition separating the first atmosphere from the second atmosphere. The first cover includes a thermosetting resin and covers an exposed portion of the electric wires, which is not covered by the outer cover in the second atmosphere. The second cover covers the first cover and includes a material higher in fracture strength than the thermosetting resin.

According to another aspect of the present disclosure, an explosion-proof system includes a cable and an explosion-proof machine. The cable includes electric wires each of which including a conductive core and an insulator covering the conductive core. The cable includes an outer cover covering the electric wires, the outer cover extending from a first atmosphere to a second atmosphere less explosive than the first atmosphere. The cable includes a partition supporting an outer surface of the outer cover and separating the first atmosphere from the second atmosphere. The cable includes a first cover including a thermosetting resin and covering an exposed portion of the electric wires not covered by the outer cover. The cable includes a second cover covering the first cover and including a material higher in fracture strength than the thermosetting resin. The explosion-proof machine has the second atmosphere inside the explosion-proof machine and through which the cable is passed via the partition to separate the second atmosphere inside the explosion-proof machine from the first atmosphere.

According to further aspect of the present disclosure, a cable includes electric wires, an outer cover, a thermosetting resin, and a metal. Each of the electric wires includes a conductive core and an insulator covering the conductive core. The outer cover covers the electric wires. The outer cover is supported by a support. The thermosetting resin covers an exposed portion of the electric wires not covered by the outer cover. The metal covers the thermosetting resin.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
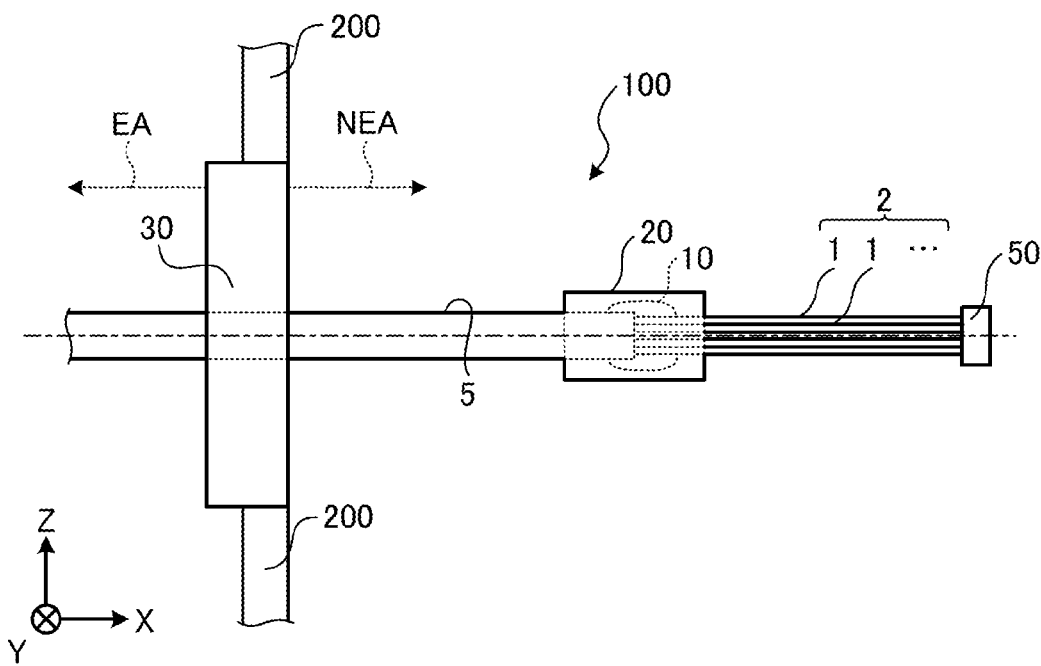
FIG. 1A is a schematic illustrating a cable according to an embodiment.

The embodiments will now be described with reference to the accompanying drawings, wherein like reference numerals designate corresponding or identical elements throughout the various drawings.

In the following description, the terms "parallel" and "perpendicular" may occasionally be used to not only mean "parallel" and "perpendicular", respectively, in a strict sense but also mean "parallel" and "perpendicular", respectively, in an approximate sense. That is, the terms "parallel" and "perpendicular" are used taking into consideration production-related and installation-related tolerances and errors.

A cable 100 according to this embodiment will be outlined by referring to FIG. 1A. FIG. 1A is a schematic illustrating the cable 100 according to this embodiment. In order to facilitate the understanding of the description, FIG. 1A shows a three-dimensional orthogonal coordinate system with X axis, Y axis, and Z axis. This orthogonal coordinate system may also be illustrated in some other drawings referred to in the following description.

As illustrated in FIG. 1A, the cable 100 is what is called a collective cable that includes a plurality of electric wires 1 and an outer cover 5. Each of the plurality of electric wires 1 has a conductive core covered with an insulator, and the outer cover 5 covers the plurality of electric wires 1. In the following description, the plurality of electric wires 1 covered with the outer cover 5 may occasionally be referred to as electric wire group 2 as illustrated in FIG. 1A.

The electric wire group 2 is connected at one end with a connector 50 for connection with external machines and/or devices. In the following description, the electric wire group 2 and the outer cover 5 may occasionally be referred to as outer cover 5 collectively. For example, when the outer cover 5 and the electric wire group 2 undergo pressing, this may occasionally be described as "the outer cover 5 is pressed".

The cable 100 extends across a first atmosphere EA and a second atmosphere NEA and pressed by a partition 30, which partitions the first atmosphere EA and the second atmosphere NEA from each other. Specifically, the outer surface of the cable 100, that is, the outer cover 5 is pressed by the partition 30. The partition 30 is mounted air-tight on an outer wall 200 of an explosion-proof machine. Details of the partition 30 will be described later by referring to FIG. 10A and other drawings.

The first atmosphere EA refers to a space where explosive or flammable gas or vapor may possibly occur or exist while the explosion-proof machine is in operation. The second atmosphere NEA refers to a space that is less explosive or less flammable than the first atmosphere EA. Specifically, the second atmosphere NEA is implemented by increasing the internal pressure or air tightness of the explosion-proof machine, thereby eliminating or minimizing explosive or flammable gas inside the explosion-proof machine.

For ease of description, the first atmosphere EA will be referred to as "explosive atmosphere EA", and the second atmosphere NEA will be referred to as "non-explosive atmosphere NEA". For example, a coating booth in which a coating robot is disposed corresponds to the explosive atmosphere EA, and the inside of the coating robot and the outside of the coating booth correspond to the non-explosive atmosphere NEA.

In the non-explosive atmosphere NEA, the cable 100 includes fire-spread preventing means for preventing a fire from spreading for an exposed portion of the electric wire group 2 not covered by the outer cover 5. The cable 100 also includes damage preventing means for preventing damage to the fire-spread preventing means for preventing a fire from spreading.

Specifically, the cable 100 includes a first cover 10. The first cover 10 covers the exposed portion of the electric wire group 2 not covered by the outer cover 5, thus serving the purpose of the fire-spread preventing means. The first cover 10 is made of thermosetting resin such as epoxy resin. The thermosetting resin fills the gaps between the electric wires 1 and covers the outer surface of the electric wire group 2. The first cover 10 also covers a part of the outer cover 5. This configuration prevents a fire from spreading through the electric wires 1.

As used herein, the thermosetting resin refers to a kind of resin that forms a polymer network structure as a result of polymerization reaction and that, once cured, never returns to the original state. Epoxy resin, which is a kind of thermosetting resin, is cured by mixing two kinds of liquid, namely, a prepolymer agent and a curing agent. Thus, epoxy resin needs no heating process for curing, resulting in improved workability. The term thermosetting resin is to be distinguished from thermoplastic resin (which is a kind of resin that becomes pliable at or above a predetermined temperature and cures upon cooling).

The cable 100 also includes a second cover 20. The second cover 20 covers the first cover 10, serving the purpose of the damage preventing means. The second cover 20 is made of a material that is higher in fracture strength than the thermosetting resin used for the first cover 10. Examples of the metal include, but are not limited to, iron, stainless steel, and aluminum alloy.

The second cover 20 is preferably free from damage caused by external force or may be deformed or damaged to the extent that the first cover 10 is not damaged. As used herein, being "higher in fracture strength" refers to a level of strength that protects the first cover 10 from damage. When the second cover 20 is made of metal, the second cover 20 may be molded by fusing a metal or pressing a powder metal.

In this embodiment, the second cover 20 is a hollow cylindrical metal with the first cover 10 in close contact with the inner surface of the second cover 20. In this respect, the first cover 10 is arranged on the inner surface of the second cover 20 before the first cover 10 is cured. With the first cover 10 cured, the electric wire group 2 is covered with two cover layers, the first cover layer being the first cover 10 and the second cover layer being the second cover 20.

Thus, the first cover 10 of the cable 100 prevents a fire from spreading through the electric wire group 2, and the second cover 20 prevents damage to the first cover 10. The first cover 10 and the second cover 20 can be attached to wires on-site, at a plant or a factory. This improves the working efficiency with which the cable 100 is wired.

As described above, the cable 100 is supported by the partition 30, and the partition 30 partitions the explosive atmosphere EA and the non-explosive atmosphere NEA from each other. In addition to this configuration, the first cover 10 and the second cover 20 prevent a fire from spreading through the electric wire group 2.

Thus, the isolating member and the fire-spread preventing member are separated from each other. This configuration makes the size of the fire-spread preventing member (that is, the first cover 10 and the second cover 20) smaller as compared with the case where the isolating member and the fire-spread preventing member are integral to each other. This enables cables 100 to be arranged more densely, resulting in improved space efficiency.

Figure 1B:
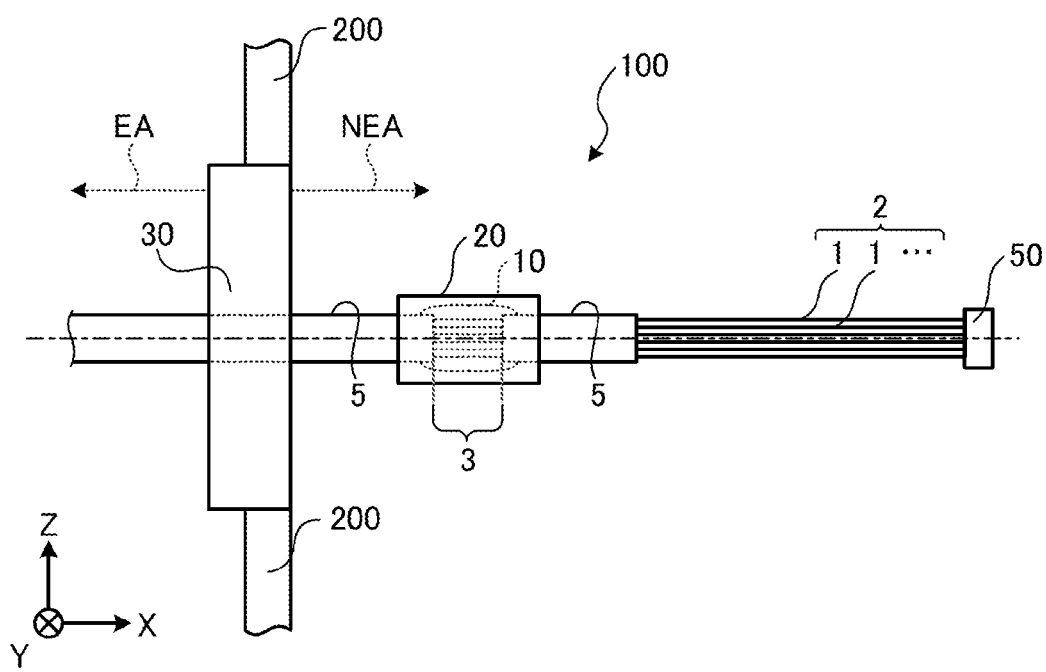
FIG. 1B is a schematic illustrating another position at which a second cover is mounted.

In the embodiment of FIG. 1A, the first cover 10 and the second cover 20 are disposed at an exposed portion of each electric wire 1 at one end of the outer cover 5. In another possible embodiment, the first cover 10 and the second cover 20 is disposed at another exposed portion of each electric wire 1 at an intermediate portion of the outer cover 5. This possible embodiment will be described by referring to FIG. 1B. FIG. 1B is a schematic illustrating another position at which the second cover 10 is mounted. In the following description, like reference numerals designate corresponding or identical elements throughout FIGS. 1A and 1B, and these elements will be least elaborated in the following description.

As illustrated in FIG. 1B, the first cover 10 and the second cover 20 are disposed at a portion 3. At the portion 3, the outer cover 5 is broken. The portion 3 is formed by cutting the entire circumferences of two positions on the outer cover 5 and removing the resulting free portion of the outer cover 5. In another possible embodiment, the portion 3 is formed by cutting the entire circumference of one position on the outer cover 5 and shifting at least one divided half of the outer cover 5.

The thermosetting resin of the first cover 10 fills the gaps between the electric wires 1 and covers the outer surface of the electric wire group 2. The first cover 10 partially covers the divided halves of the outer cover 5 at both ends of the portion 3. This configuration prevents a fire from spreading through the electric wires 1.

Before the first cover 10 is cured, the first cover 10 is brought into close contact with the inner surface of the second cover 20. With the first cover 10 cured, the electric wire group 2 is covered with two cover layers, the first cover layer being the first cover 10 and the second cover layer being the second cover 20.

Figure 2A:
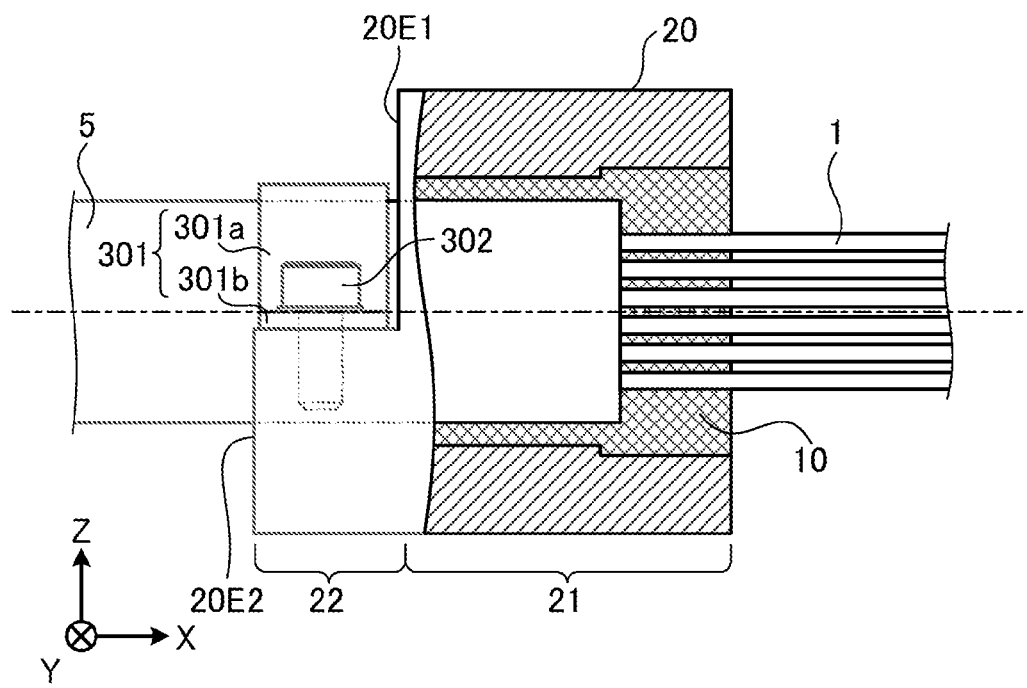
FIG. 2A is a partial sectional view of the first cover and the second cover.
Figure 2B:
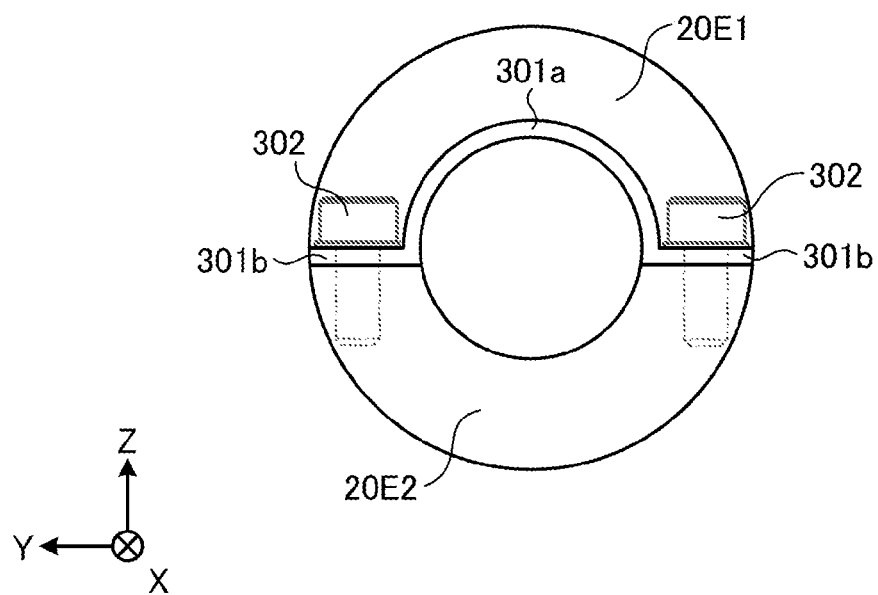
FIG. 2B is a front end view of the second cover illustrated in FIG. 2A.

By referring to FIGS. 2A and 2B, the shape of the second cover 20 illustrated in FIGS. 1A and 1B will be described in detail. FIG. 2A is a partial sectional view of the first cover 10 and the second cover 20, and FIG. 2B is a sectional view of the second cover 20 illustrated in FIG. 2A.

In FIG. 2A, the first cover 10 and the second cover 20 are cut on a plane approximately parallel to the X-Z plane and passing through the center line of the outer cover 5, with the outer cover 5 and the electric wires 1 not illustrated in sectional view. FIG. 2B is a view, from the X-axis backward direction, of the second cover 20 illustrated in FIG. 2A. In FIG. 2B, the electric wires 1 and the outer cover 5 are not illustrated.

As illustrated in FIG. 2A, the second cover 20 includes a hollow cylindrical through portion 21 and a pressure portion 22. The through portion 21 is for the outer cover 5 to pass through. The pressure portion 22 presses the outer surface of the outer cover 5. The through portion 21 includes a larger inner diameter portion and a smaller inner diameter portion. The larger inner diameter portion is larger in inner diameter than the smaller inner diameter portion, and located at the exposed portion of each electric wire 1 not covered by the outer cover 5. The smaller inner diameter portion is located at an un-exposed portion of each electric wire 1 covered by the outer cover 5. This configuration makes the first cover 10 greater in thickness.

The pressure portion 22 protrudes from the through portion 21 in the direction in which the outer cover 5 extends (in the X axis direction), and has a semicircular, cylindrical shape. At the semicircular, cylindrical shape of the pressure portion 22, the outer cover 5 is exposed and fixed to the second cover 20 with a fixture 301. In the embodiment of FIG. 2A, the portion of the pressure portion 22 protruding from the through portion 21, the fixture 301, and bolts 302 constitute the pressure portion 22.

As illustrated in FIG. 2B, the fixture 301 includes a pressure portion 301a and a pair of legs 301b. The pressure portion 301a is curved in a semicircular shape. The pair of legs 301b extend outward from both ends of the pressure portion 301a. Each leg 301b has a hole through which a bolt 302 is passed through.

FIG. 2B illustrates, for reference purposes, an end surface 20E1 (of the through portion 21) and an end surface 20E2 (of the pressure portion 22), which are also illustrated in FIG. 2A. The inner diameter of the semicircular shape of the end surface 20E2 and the inner diameter of the pressure portion 301a are preferably smaller than the outer diameter of the outer cover 5. This configuration ensures that with the bolts 302 secured into screw holes disposed on the pressure portion 22, the fixture 301 is fixed to the second cover 20 while pressing the outer cover 5.

Thus, the through portion 21 of the second cover 20 increases the reliability with which the second cover 20 is prevented from being removed from the outer cover 5 with the first cover 10. Also, the pressure portion 22 of the second cover 20 increases the reliability with which the second cover 20 is prevented from being displaced from the outer cover 5 with the first cover 10. Additionally, the pressure portion 22 keeps the center line of the outer cover 5 aligned with the center line of the second cover 20. This configuration makes the thickness of the first cover 10 approximately uniform throughout the circumference of the first cover 10.

The shape of the second cover 20 illustrated in FIGS. 2A and 2B may vary as illustrated in FIGS. 3 to 9E. In the following description, like reference numerals designate corresponding or identical elements throughout FIGS. 2A to 9E, and these elements will be least elaborated in the following description.

Figure 3:
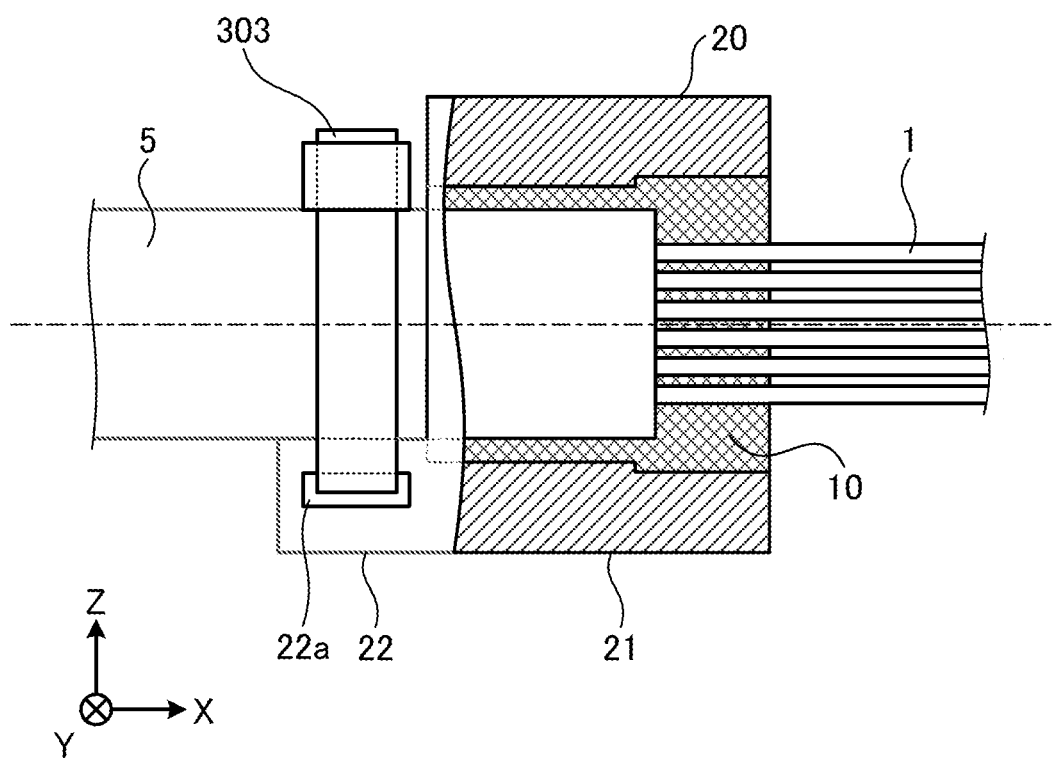
FIG. 3 is a partial sectional view of another exemplary second cover.

FIG. 3 is a partial sectional view of another exemplary second cover 20. The second cover 20 illustrated in FIG. 3 is different from the second cover 20 illustrated in FIG. 2A in that the outer cover 5 is fixed to the second cover 20 with a band 303. As illustrated in FIG. 3, the pressure portion 22 protrudes from the through portion 21 in the direction in which the outer cover 5 extends (in the X axis direction). The pressure portion 22 includes a through hole 22a, through which the band 303 is passed through.

In the embodiment of FIG. 3, the portion of the pressure portion 22 protruding from the through portion 21 in the X axis direction, the through hole 22a, and the band 303 constitute the pressure portion 22. Instead of the through hole 22a, a depression may be formed over the outer circumference of the pressure portion 22 so that the band 303 runs through the depression.

The upper surface (in the Z-axis forward direction) of the pressure portion 22 is curved in a circular shape that approximates the outer surface of the outer cover 5. A view of the shape of the pressure portion 22 from the X-axis backward direction may be a partially cut-away circle, a rectangle, or any other shape insofar as the positioning of the outer cover 5 is ensured and the displacement of the band 303 is eliminated or minimized. In the pressure portion 22 illustrated in FIG. 3, the center line of the outer cover 5 is preferably aligned with the center line of the second cover 20, similarly to the pressure portion 22 illustrated in FIG. 2A.

Figure 4A:
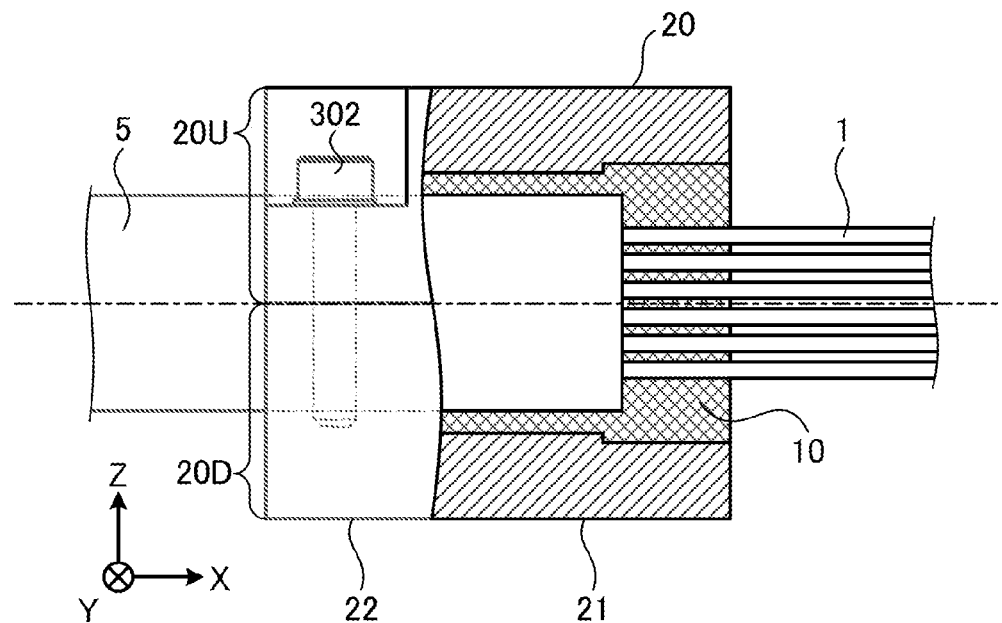
FIG. 4A is a partial sectional view of a dividable second cover.
Figure 4B:
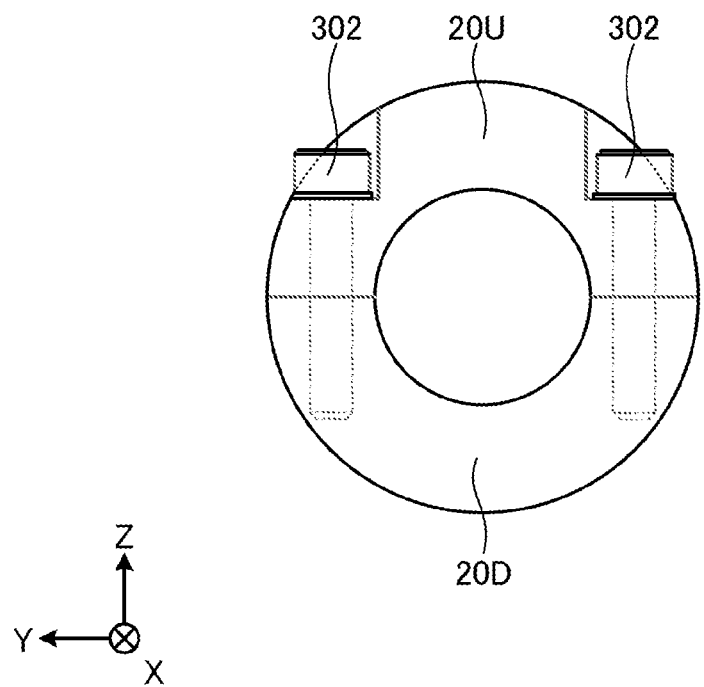
FIG. 4B is a front end view of the second cover illustrated in FIG. 4A.

By referring to FIGS. 4A and 4B, description will be made with regard to a second cover 20 that is dividable to hold the outer cover 5 in the second cover 20. FIG. 4A is a partial sectional view of the dividable second cover 20. FIG. 4B is a front end view of the second cover 20 illustrated in FIG. 4A.

In FIG. 4A, the first cover 10 and the second cover 20 are cut on a plane approximately parallel to the X-Z plane and passing through the center line of the outer cover 5, with the outer cover 5 and the electric wires 1 not illustrated in sectional view. FIG. 4B is a view, from the X-axis backward direction, of the second cover 20 illustrated in FIG. 4A. In FIG. 4B, the electric wires 1 and the outer cover 5 are not illustrated.

As illustrated in FIG. 4A, the second cover 20 includes a member 20U and a member 20D. The member 20U and the member 20D each have such a shape that a hollow cylinder is cut in half in the axial direction. The member 20U has bearing surfaces and holes for the bolts 302. The member 20D has screw holes to secure the bolts 302.

The member 20U and the member 20D together form an inner diameter that corresponds to the inner diameter of the pressure portion 22 and that is preferably smaller than the outer diameter of the outer cover 5. With the bolts 302 secured in the member 20U and the member 20D, the member 20U and the member 20D are fixed to the outer cover 5 while pressing the outer cover 5.

In the embodiment of FIG. 4B, the member 20U and the member 20D are fixed with two bolts 302. In another possible embodiment, a single bolt 302 is used. In the embodiment of FIGS. 4A and 4B, the bolts 302 are secured into the screw holes of the member 20D. In another possible embodiment, the member 20D has approximately the same shape as the shape of the member 20U, in which case the bolts 302 are passed through the member 20U and the member 20D and secured with nuts (not illustrated).

Figure 5A:
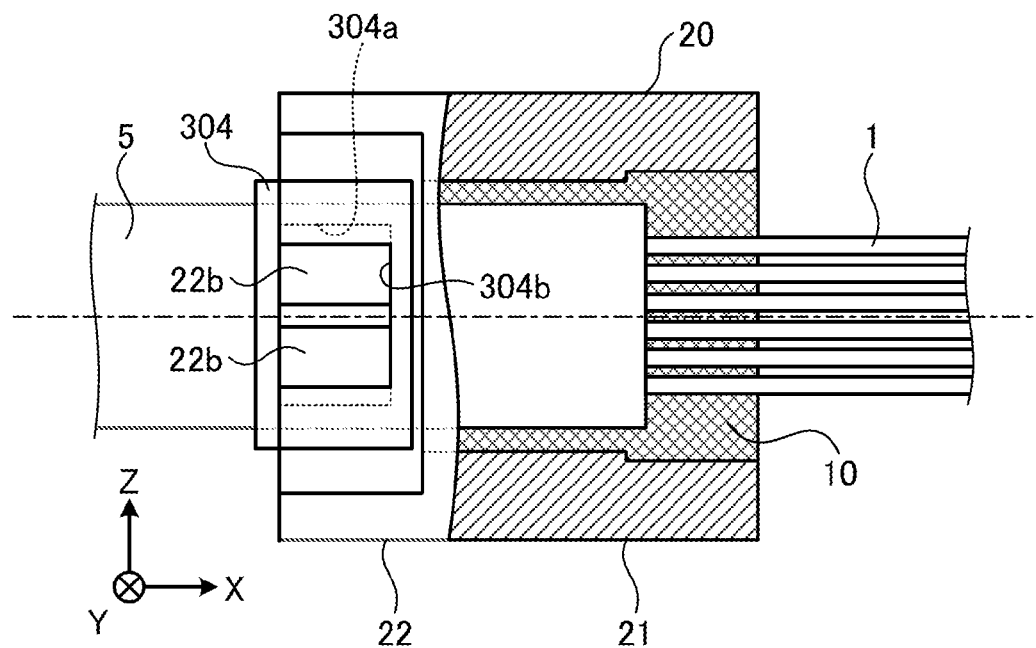
FIG. 5A is a partial sectional view of another exemplary second cover.
Figure 5B:
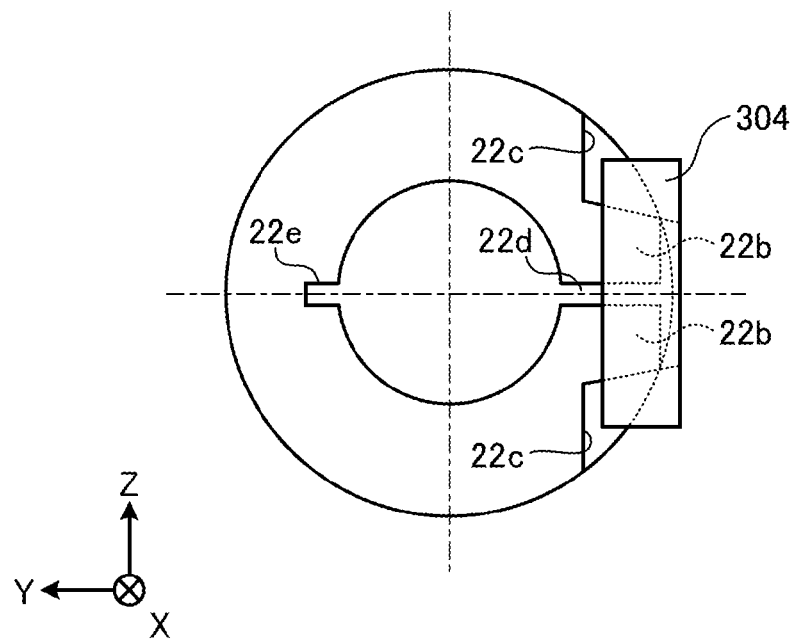
FIG. 5B is a front end view of the second cover illustrated in FIG. 5A.

By referring to FIGS. 5A and 5B, description will be made with regard to a second cover 20 provided with a slit that makes the second cover 20 deformable to hold the outer cover 5 in the second cover 20. FIG. 5A is a partial sectional view of this second cover 20. FIG. 5B is a front end view of the second cover 20 illustrated in FIG. 5A.

In FIG. 5A, the first cover 10 and the second cover 20 are cut on a plane approximately parallel to the X-Z plane and passing through the center line of the outer cover 5, with the outer cover 5 and the electric wires 1 not illustrated in sectional view. FIG. 5B is a view, from the X-axis backward direction, of the second cover 20 illustrated in FIG. 5A. In FIG. 5B, the electric wires 1 and the outer cover 5 are not illustrated.

As illustrated in FIGS. 5A and 5B, the second cover 20 includes a pair of claws 22b, a slit 22d, and bottoms 22c. The pair of claws 22b are disposed on the pressure portion 22. The slit 22d is disposed at a portion of the pressure portion 22. The pair of claws 22b stand on the bottoms 22c and face each other across the slit 22d. Each claw 22b is tapered on the surface opposite to the slit 22d.

As illustrated in FIG. 5A, a wedge-shaped fixture 304 and a rectangular opening 304b are disposed. The opening 304b receives the pair of claws 22b. The wedge-shaped fixture 304 has an opening 304a on the back surface the wedge-shaped fixture 304. The opening 304a has a width in the Z axis direction larger than the width of the opening 304b in the Z axis direction. The wedge-shaped fixture 304 also has a through hole through which the opening 304a and the opening 304b communicate with each other.

Referring to FIG. 5B, if the wedge-shaped fixture 304 is moved in the Y-axis forward direction, the pressure portion 22 is deformed in such a manner that the pair of claws 22b come close to each other and thus press the outer cover 5 inward.

As illustrated in FIG. 5B, the second cover 20 also includes a cut 22e on a portion of the inner surface of the pressure portion 22 facing the slit 22d. Providing the cut 22e makes the pressure portion 22 more easily deformable, increasing the working efficiency with which the outer cover 5 is fixed to the second cover 20. In another possible embodiment, the cut 22e is omitted.

Figure 6A:
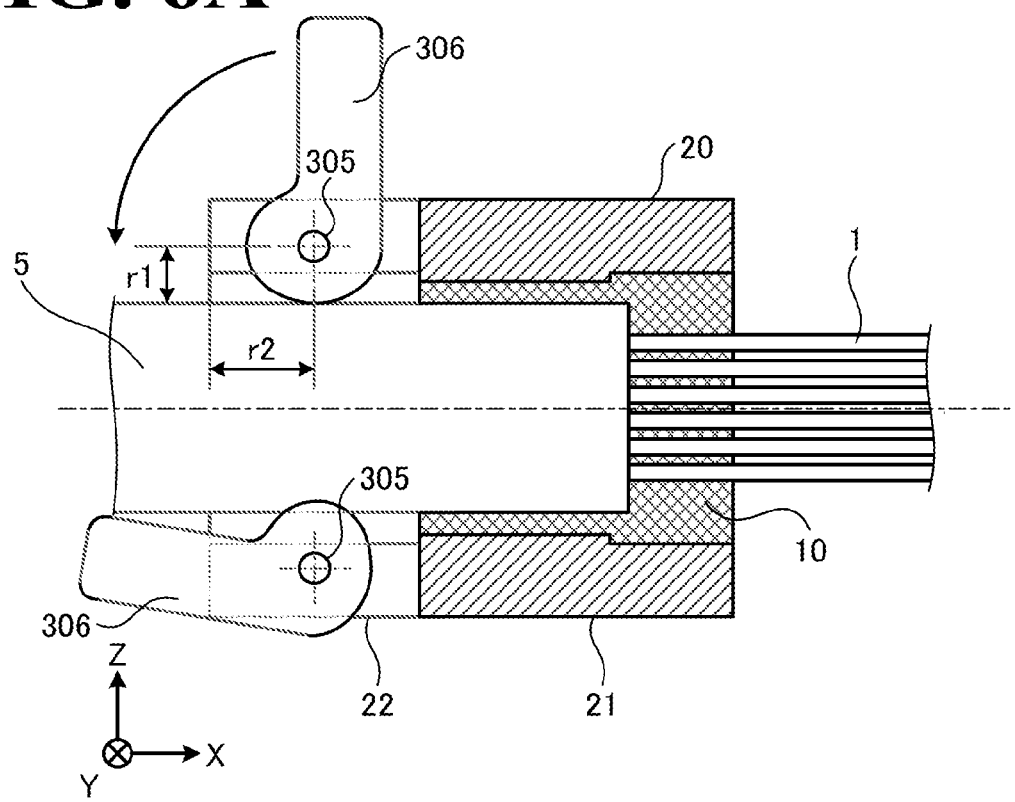
FIG. 6A is a partial sectional view of another exemplary second cover.

By referring to FIG. 6A, description will be made with regard to a second cover 20 provided with levers turnable to press the outer cover 5. FIG. 6A is a partial sectional view of this second cover 20. In FIG. 6A, the first cover 10 and the second cover 20 are cut on a plane approximately parallel to the X-Z plane and passing through the center line of the outer cover 5, with the outer cover 5 and the electric wires 1 not illustrated in sectional view.

As illustrated in FIG. 6A, the pressure portion 22 includes a pair of levers 306, which are arranged with the outer cover 5 held between the pair of levers 306. Each of the pair of levers 306 is supported by and turnable about a support axis 305. The support axis 305 extends from the pressure portion 22 in the Y axis direction. Each lever 306 has a base (a portion closest to the support axis 305) having what is called a cam shape. The cam shape has a non-uniform diameter centered around the support axis 305.

Specifically, as illustrated in FIG. 6A, the diameter of the base of each lever 306 changes from diameter r1 to diameter r2 (diameter r1<diameter r2). In FIG. 6A, the lever 306 disposed further in the Z-axis forward direction is in normal posture, and the lever 306 disposed further in the Z-axis backward direction is in pressing posture.

By turning the lever 306 in normal posture in the direction indicated by the arrow illustrated in FIG. 6A, the lever 306 is brought into pressing posture, with the r2-diameter portion of the base pressing the outer cover 5. When both levers 306 illustrated in FIG. 6A are in pressing posture, the levers 306 press the outer cover 5, which is held between the levers 306.

In the embodiment of FIG. 6A, two levers 306 are used to hold the outer cover 5. In another possible embodiment, a single lever 306 is used. In this case, the inner surface of the pressure portion 22 at the portion without a lever 306 is preferably curved along the shape of the outer cover 5.

Figure 6B:
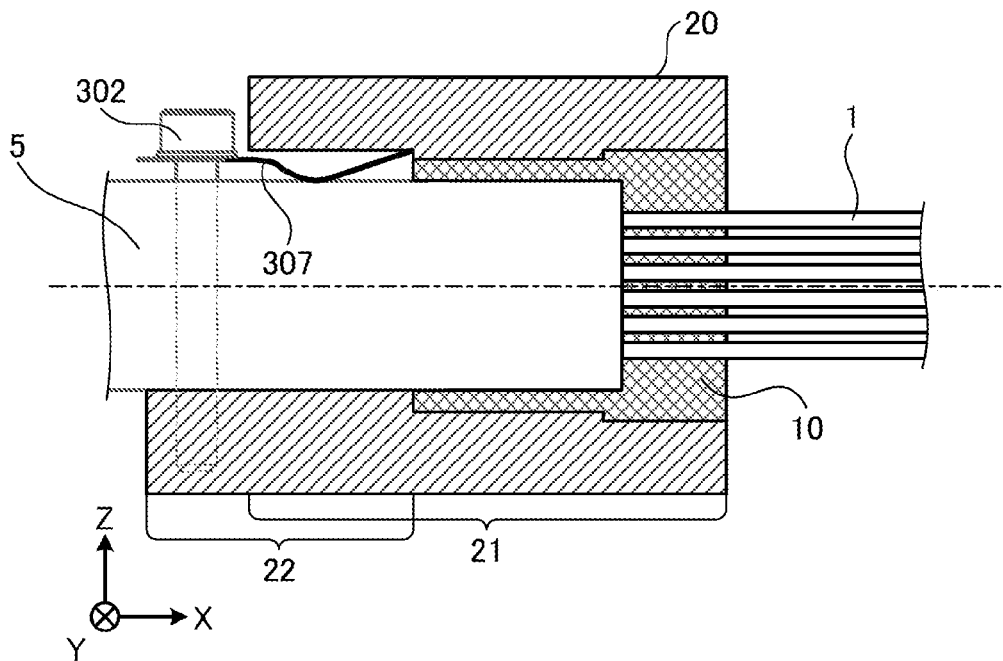
FIG. 6B is a partial sectional view of another exemplary second cover.

By referring to FIG. 6B, description will be made with regard to a second cover 20 provided with a pressure spring through which the outer cover 5 is pressed. FIG. 6B is a partial sectional view of this second cover 20. In FIG. 6B, the first cover 10 and the second cover 20 are cut on a plane approximately parallel to the X-Z plane and passing through the center line of the outer cover 5, with the outer cover 5 and the electric wires 1 not illustrated in sectional view.

As illustrated in FIG. 6B, a pressure spring 307 is a plate member curved (protruding) toward the outer cover 5. The pressure spring 307 has through holes through which a pair of bolts 302 are passed through. At one end, the pressure spring 307 is in contact with the inner surface of the through portion 21. At the other end, the pressure spring 307 is connected with the heads of the pair of bolts 302 and thus forced toward the outer cover 5 with the curved portion of the pressure spring 307 pressing the outer cover 5. In the embodiment of FIG. 6B, one of the pair of bolts 302 is disposed on the Y-axis forward direction side of the outer cover 5, and the other one of the pair of bolts 302 is disposed on the Y-axis backward direction side of the outer cover 5. In another possible embodiment, a single bolt 302 is used to press the pressure spring 307.

The pressure portion 22 has screw holes to secure the bolts 302. The inner surface of the pressure portion 22 is preferably curved along the shape of the outer cover 5. The pressure portion 22 illustrated in FIG. 6B partially overlaps the through portion 21 in the X axis direction. Making the pressure portion 22 and the through portion 21 partially overlap makes the length of the second cover 20 (width in the X axis direction) smaller.

Figure 7A:
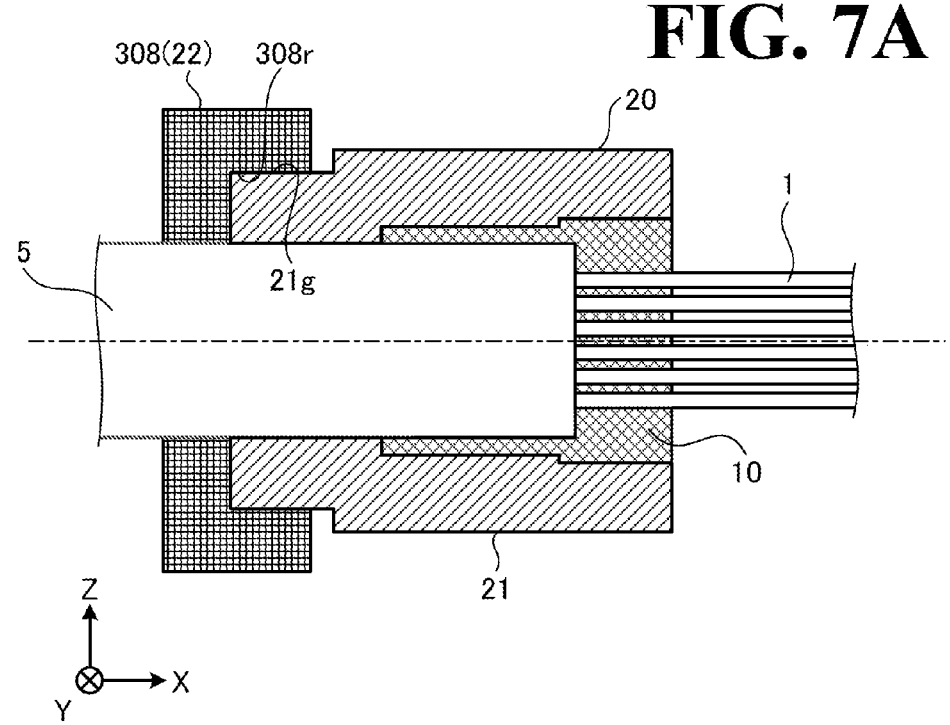
FIG. 7A is a partial sectional view of another exemplary second cover.
Figure 7B:
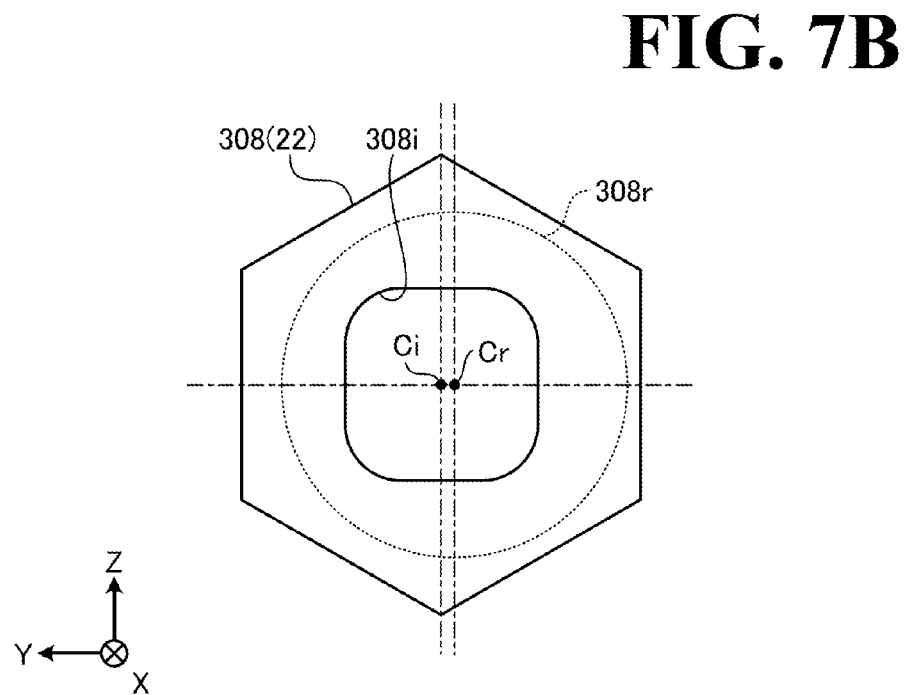
FIG. 7B is a front end view of the second cover illustrated in FIG. 7A.

By referring to FIGS. 7A and 7B, description will be made with regard to a second cover 20 provided with an eccentric nut through which the outer cover 5 is pressed. FIG. 7A is a partial sectional view of this second cover 20. FIG. 7B is a front end view of an eccentric nut 308 illustrated in FIG. 7A.

In FIG. 7A, the outer cover 5 and the electric wires 1 are not illustrated in sectional view. FIG. 7B is a view, from the X-axis backward direction, of the eccentric nut 308 illustrated in FIG. 7A. In FIG. 7B, the electric wires 1, the outer cover 5, and the second cover 20 are not illustrated.

As illustrated in FIG. 7A, the second cover 20 includes the eccentric nut 308. The eccentric nut 308 serves the purpose of the pressure portion 22. The through portion 21 has a diminished outer diameter on the eccentric nut 308-side end of the through portion 21. On the inner surface of the eccentric nut 308, an internal thread 308r is disposed. Thus, the eccentric nut 308 is in the form of a lid, and the lid has a through hole through which the outer cover 5 is passed.

Specifically, as illustrated in FIG. 7B, the eccentric nut 308 has a through hole 308i on the lid for the outer cover 5 to pass through. The through hole 308i has a center Ci. The center Ci is not concentric to the center, Cr, of the internal thread 308r. This configuration ensures that with the eccentric nut 308 fitted with the external thread 21g of the through portion 21, part of the through hole 308i is in close contact with the outer surface of the outer cover 5. In this manner, the second cover 20 is fixed to the outer cover 5.

In the embodiment of FIG. 7B, the through hole 308i has a chamfered square shape. In another possible embodiment, the through hole 308i has an ellipse shape, a polygonal shape, or any other shape. Also in the embodiment of FIG. 7B, the eccentric nut 308 has a hexagonal outer shape. In another possible embodiment, the eccentric nut 308 has some other outer shape, similarly to the through hole 308i.

Figure 8:
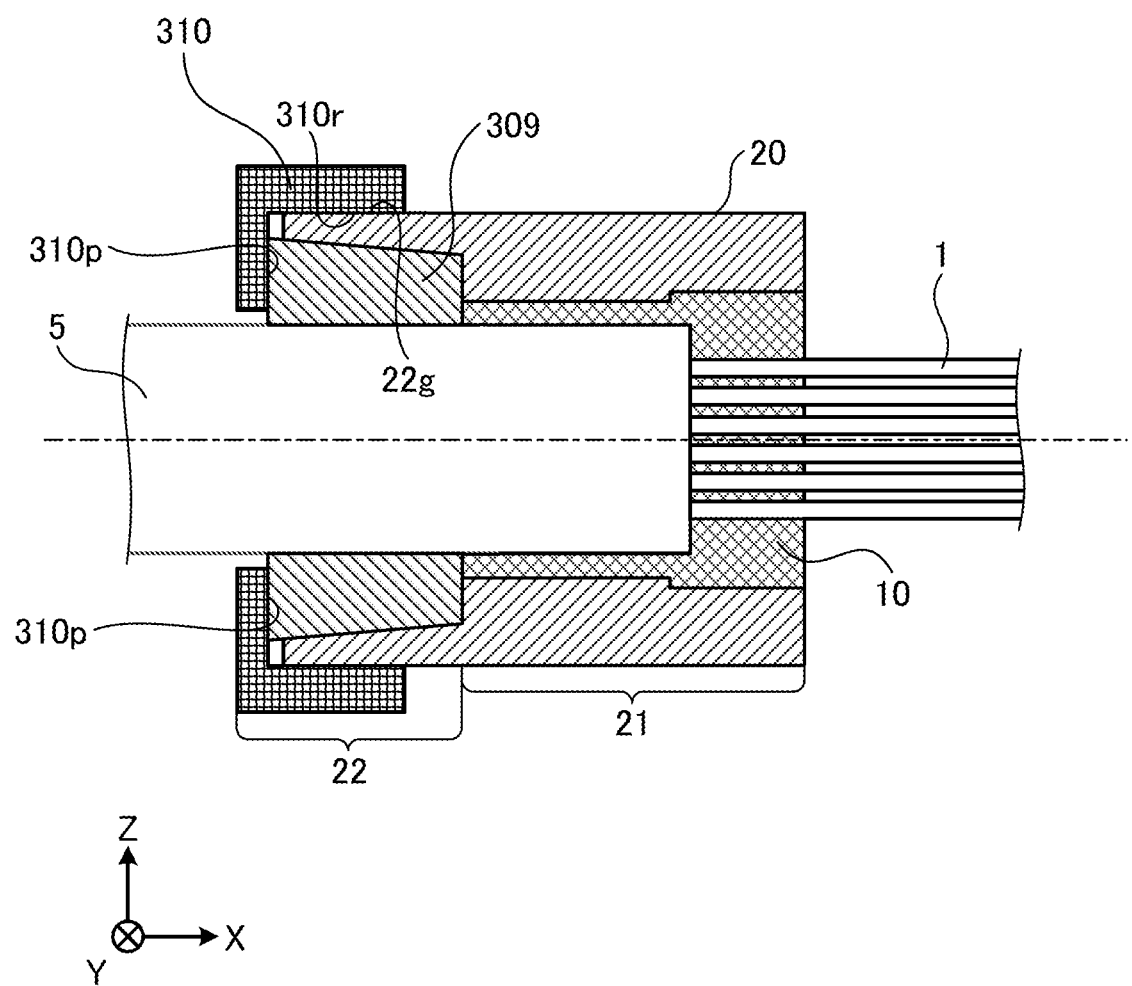
FIG. 8 is a partial sectional view of another exemplary second cover.

By referring to FIG. 8, description will be made with regard to a second cover 20 provided with a deformable bush through which the outer cover 5 is pressed. FIG. 8 is a partial sectional view of this second cover 20. In FIG. 8, the outer cover 5 and the electric wires 1 are not illustrated in sectional view.

As illustrated in FIG. 8, the second cover 20 includes a taper portion on the inner surface of the second cover 20. The taper portion has an inner diameter that increases as the tapering proceeds toward the end surface of the second cover 20 in the X-axis backward direction. In the taper portion of the second cover 20, a bush 309 is disposed. The bush 309 has an outer shape that approximates the taper portion. The bush 309 is made of a deformable material such as rubber, and has a through hole through which the outer cover 5 is passed.

The second cover 20 also includes a pressure nut 310. The pressure nut 310 presses the bush 309 in the X-axis forward direction. As illustrated in FIG. 8, the pressure nut 310 is in the form of a lid, and the lid has a through hole having a diameter larger than the diameter of the outer cover 5. On the inner surface of the pressure nut 310, an internal thread 310r is disposed. On the outer surface of the second cover 20, an external thread 22g is disposed.

The pressure nut 310 is fitted with the external thread 22g of the second cover 20 with the bush 309 pressed in the X-axis forward direction on a pressure surface 310p, which is the back surface of the lid (pressure nut 310). The pressed bush 309, in turn, presses the portion of the outer cover 5 contacting the inner surface of the bush 309. This configuration ensures that the second cover 20 is fixed to the outer cover 5.

Figure 9A:
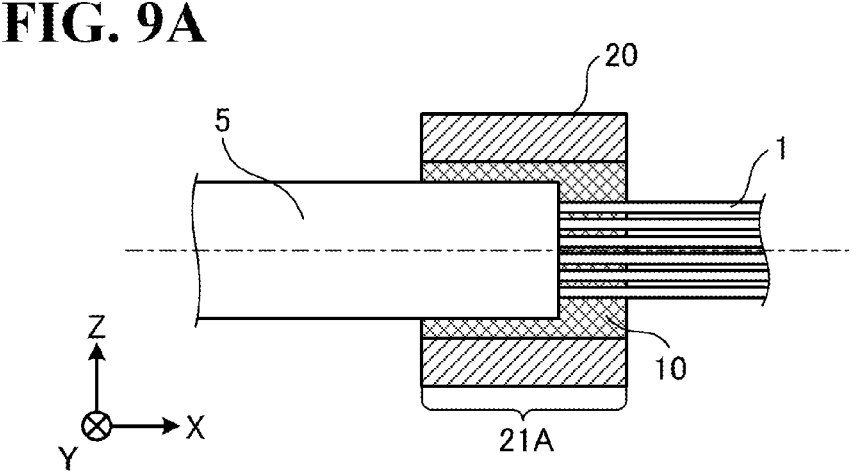
FIG. 9A is a sectional view of a through portion illustrating an exemplary shape of the inner surface of the through portion.

By referring to FIGS. 9A to 9E, description will be made with regard to possible variations of the shape of the inner surface of the through portion 21 of the second cover 20. FIG. 9A is a sectional view of the through portion 21 illustrating an exemplary shape of the inner surface of the through portion 21. Each of FIGS. 9B to 9E is a sectional view of the through portion 21 illustrating another exemplary shape of the inner surface of the through portion 21. Each of the through portions 21 illustrated in FIGS. 9A to 9E can be combined with any of the pressure portions 22 illustrated in FIGS. 2A to 8.

A through portion 21A illustrated in FIG. 9A has a "straight" inner diameter, that is, has a uniform inner diameter in the X axis direction. While in FIG. 2A and other drawings described above the inner diameter of the through portion changes stepwise, the inner diameter of the through portion may have the shape of the through portion 21A illustrated in FIG. 9A.

Figure 9B:
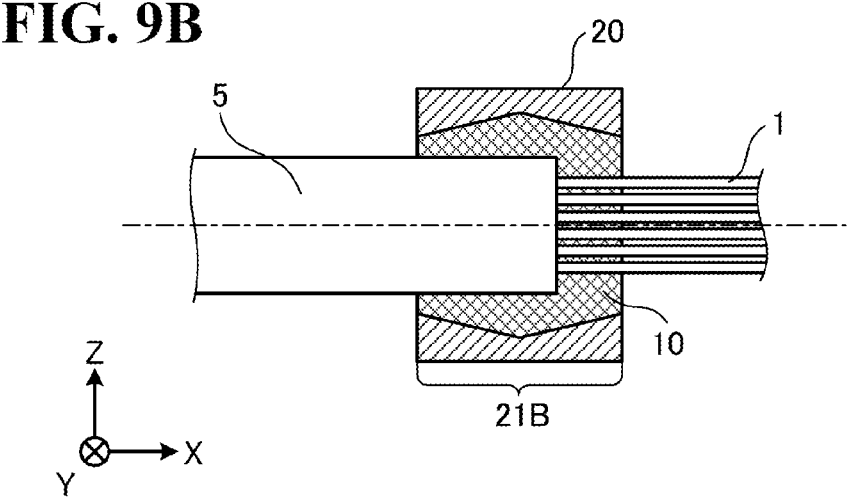
FIG. 9B is a sectional view of a through portion illustrating another exemplary shape of the inner surface of the through portion.

A through portion 21B illustrated in FIG. 9B has a tapered inner surface that is larger in diameter at a center portion of the through portion 21B in the X axis direction than at end portions of the through portion 21B in the X axis direction. Thus, the shape of the inner surface of the through portion 21B changes in the X axis direction. This configuration prevents the first cover 10 from being displaced in the X axis direction. In the embodiment of FIG. 9B, the inner surface of the through portion 21B is maximum at the center portion in the X axis direction. In another possible embodiment, the inner surface of the through portion 21B is maximum at a portion displaced from the center portion in the X-axis forward direction or the X-axis backward direction.

Figure 9C:
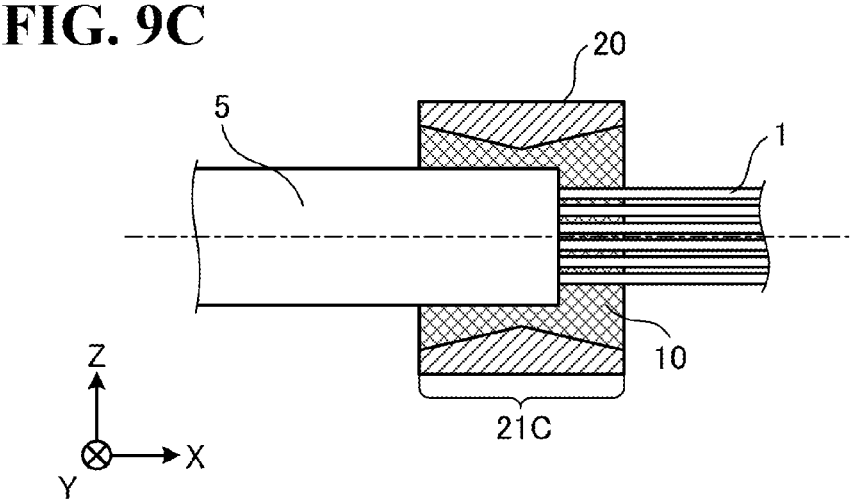
FIG. 9C is a sectional view of a through portion illustrating another exemplary shape of the inner surface of the through portion.

A through portion 21C illustrated in FIG. 9C has a tapered inner surface that is smaller in diameter at a center portion of the through portion 21C in the X axis direction than at end portions of the through portion 21C in the X axis direction. Thus, the shape of the inner surface of the through portion 21C changes in the X axis direction. This configuration prevents the first cover 10 from being displaced in the X axis direction. In the embodiment of FIG. 9C, the inner surface of the through portion 21C is minimal at the center portion in the X axis direction. In another possible embodiment, the inner surface of the through portion 21C is minimal at a portion displaced from the center portion in the X-axis forward direction or the X-axis backward direction.

Figure 9D:
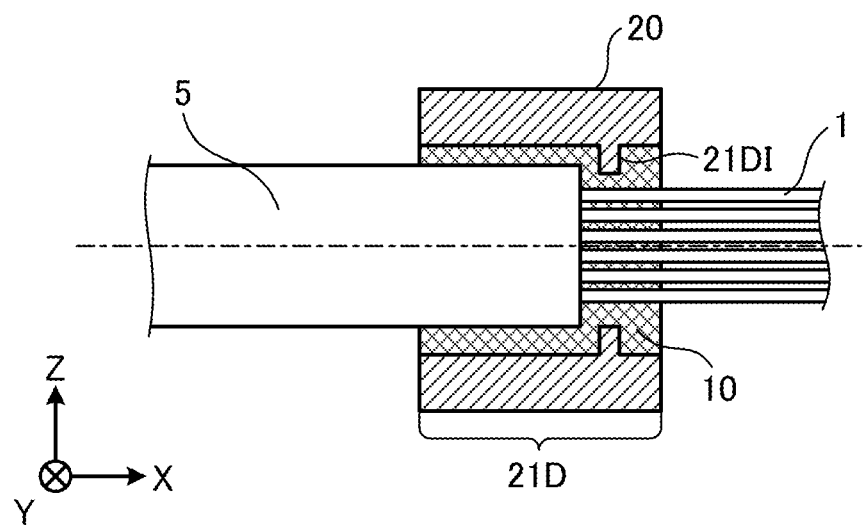
FIG. 9D is a sectional view of a through portion illustrating another exemplary shape of the inner surface of the through portion.

A through portion 21D illustrated in FIG. 9D includes an annular protrusion 21DI on the "straight" inner diameter illustrated in FIG. 9A. Providing the protrusion 21DI prevents the first cover 10 from being displaced in the X axis direction. The protrusion 21DI may not necessarily have an annular shape. In another possible embodiment, the through portion 21D includes one or a plurality of non-annular protrusions 21DI.

Figure 9E:
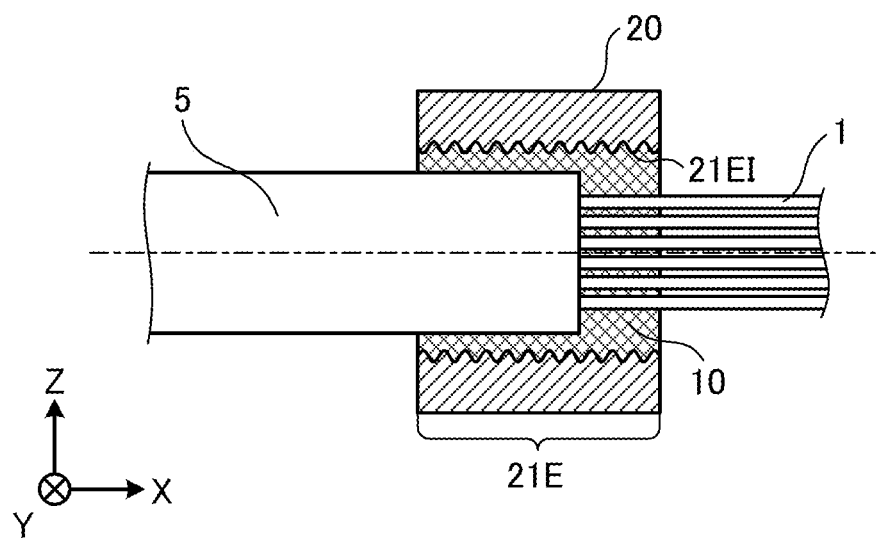
FIG. 9E is a sectional view of a through portion illustrating another exemplary shape of the inner surface of the through portion.

A through portion 21E illustrated in FIG. 9E includes, on the inner surface of the through portion 21E, a series of depressions-protrusions 21EI. The series of depressions-protrusions 21EI alternate in the X axis direction. Providing the series of depressions-protrusions 21EI prevents the first cover 10 from being displaced in the X axis direction. In another possible embodiment, the depressions or the protrusions of the depressions-protrusions 21EI are annular shaped or spiral shaped. In still another possible embodiment, the depressions-protrusions 21EI are disposed at a portion of the inner surface of the through portion 21E.

Figure 10A:
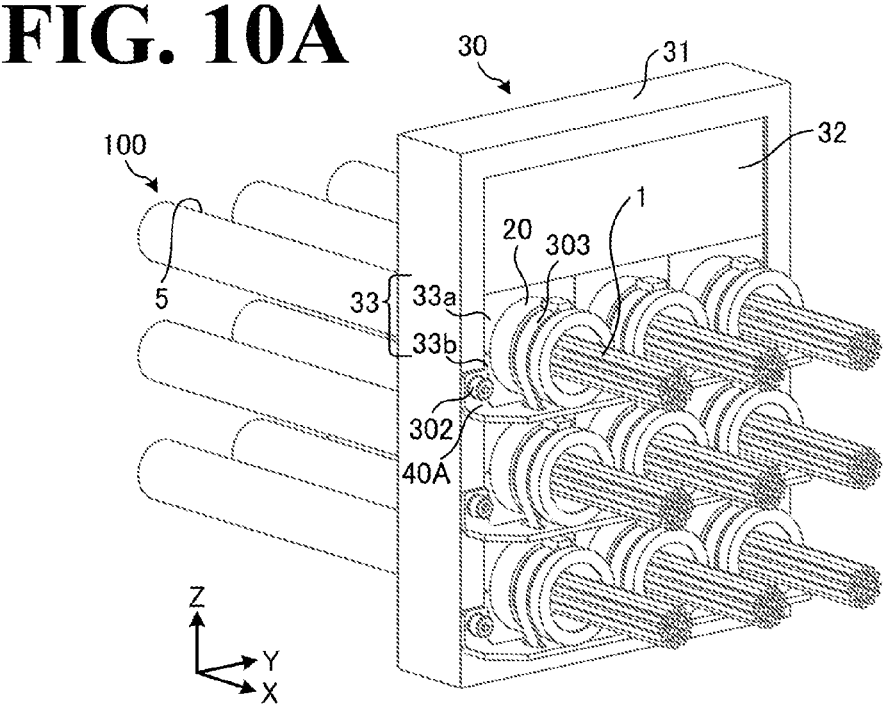
FIG. 10A is a perspective view of cables illustrating an example of how the cables are fixed.
Figure 10B:
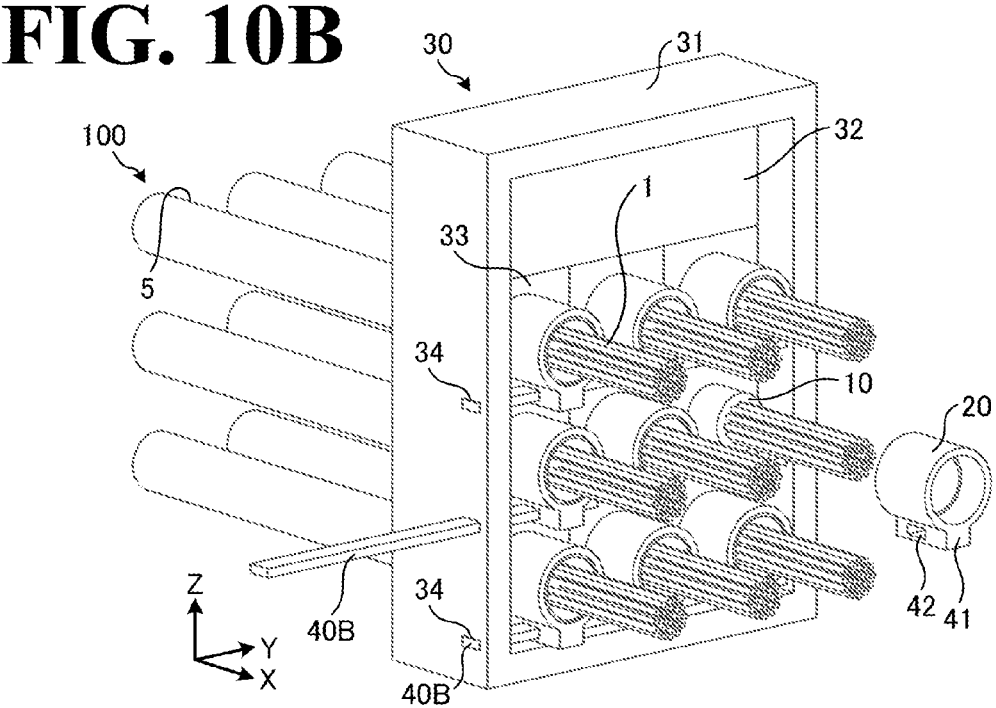
FIG. 10B is a perspective view of the cables illustrating another example of how the cables are fixed.
Figure 10C:
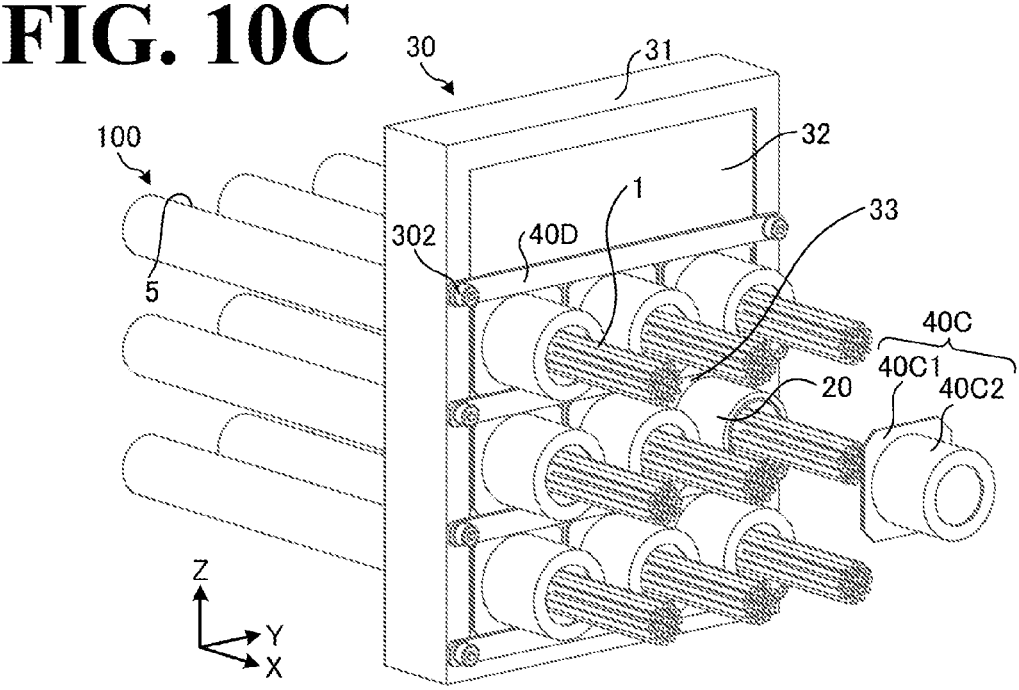
FIG. 10C is a perspective view of the cables illustrating another example of how the cables are fixed.
Figure 10D:
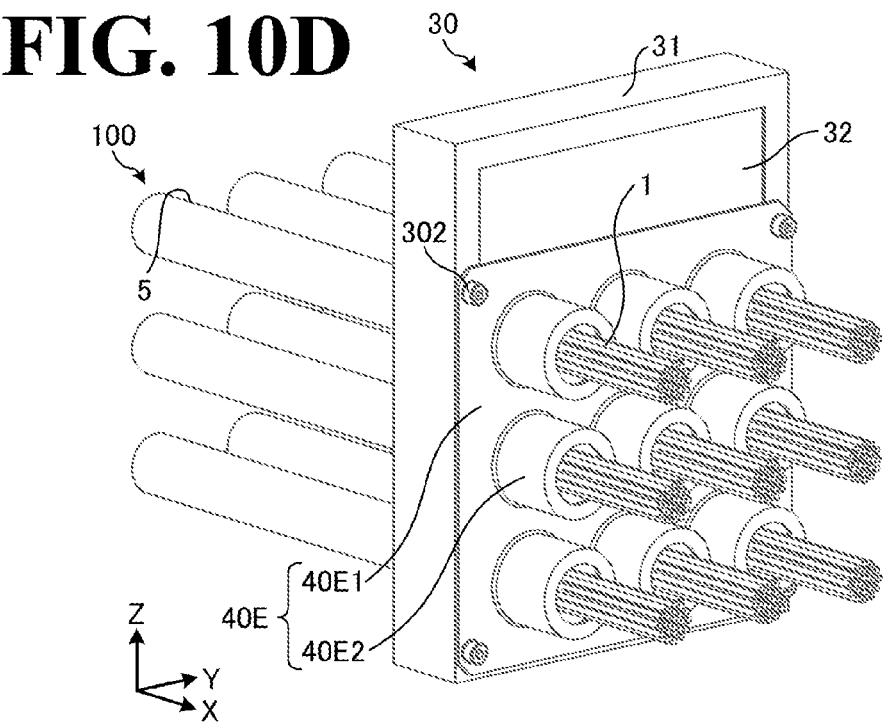
FIG. 10D is a perspective view of the cables illustrating another example of how the cables are fixed.

By referring to FIGS. 10A to 10D, description will be made with regard to how to fix the cable 100 to the partition 30 illustrated in FIGS. 1A and 1B. FIG. 10A is a perspective view of cables 100 illustrating an example of how the cables 100 are fixed. FIGS. 10B to 10D are perspective views of the cables 100 illustrating other examples of how the cables 100 are fixed.

While in the embodiments of FIGS. 10A to 10D nine cables 100 are fixed to the partition 30, any other number of cables 100 more than one may be fixed to the partition 30.

In the embodiment of FIG. 10A, the cables 100 are fixed to the partition 30 using bar-shaped fixtures 40A, bolts 302, and bands 303. The space defined on the X-axis forward direction side of the partition 30 corresponds to the non-explosive atmosphere NEA illustrated in FIG. 1A and other drawings, and the space defined on the X-axis backward direction side of the partition 30 corresponds to the explosive atmosphere EA illustrated in FIG. 1A and other drawings. This also applies in FIGS. 10B to 10D.

In the embodiment of FIG. 10A, the second cover 20 of each cable 100 is in contact with the partition 30. In another possible embodiment, a gap is defined between the second cover 20 and the partition 30. The second cover 20 may be any of the types illustrated in FIGS. 2A to 9E.

The partition 30 includes a rectangular frame 31 and rectangular seal clamps 33. The number of the seal clamps 33 is the same as the number of the cables 100. Each seal clamp 33 includes divided members 33a and 33b. The divided members 33a and 33b each have a semicircular depression. In the depression of the divided member 33a and the depression of the divided member 33b, the outer surface of the outer cover 5 of the cable 100 is held.

In the embodiment of FIG. 10A, the seal clamps 33 form a matrix of three rows and three columns defined within the frame 31, and are pressed by a pressure member 32 in the Z-axis backward direction illustrated in FIG. 10A, so that the seal clamps 33 are in close contact with each other. Although the dimension in the Y axis direction of the seal clamps 33 arranged in the matrix is larger than the width of the frame 31 in the Y axis direction, the seal clamps 33 are pressed by the opposite sides of the frame 31 in the Y axis direction and thus are in close contact with each other.

The second covers 20 of the cables 100 constituting one row (that is, three cables 100 arranged in the Y axis direction) are fixed to the same bar-shaped fixture 40A using the bands 303. The fixture 40A to which the cable 100 are fixed is fixed to the frame 31 of the partition 30 using the bolts 302. This procedure is repeated until a total of nine cables 100 constituting the three rows are fixed to the partition 30. In another possible embodiment, the fixture 40A is first fixed to the frame 31 using the bolts 302, and then the cables 100 are fixed to the fixture 40A using the bands 303.

In the embodiment of FIG. 10A, the three cables 100 constituting one row are collectively fixed to the fixture 40A. In another possible embodiment, three cables 100 constituting one column are collectively fixed to the fixture 40A. In this case, the fixture 40A is fixed to the opposite sides in the Z-axis direction of the frame 31, namely, the Z-axis forward direction side of the frame 31 and the Z-axis backward direction side of the frame 31.

In the embodiment of FIG. 10A, the second cover 20 of each cable 100 is independent of the second covers 20 of the other cables 100. In another possible embodiment, the second covers 20 of the cables 100 constituting the three-row by three-column matrix are integral to each other. In still another possible embodiment, the second covers 20 of the cables 100 constituting one row or one column are integral to each other.

The fixation mode illustrated in FIG. 10A is provided for exemplary purposes only, and various other fixation modes are possible, which will be described below by referring to FIGS. 10B to 10D. In the following description, like reference numerals designate corresponding or identical elements throughout FIGS. 10A to 10D, and these elements will be least elaborated in the following description.

FIG. 10B illustrates a fixation mode in which cables 100 are fixed to the partition 30 by "skewering" the second covers 20 of the cables 100. In FIG. 10B, the cable 100 located at the second row and the third column (the second row counted in the Z-axis backward direction and the third column counted in the Y-axis backward direction) is in a state in which the first cover 10 is yet to be covered with the second cover 20.

As illustrated in FIG. 10B, the frame 31 of the partition 30 includes through holes 34 on opposite surfaces in the Y-axis direction of the frame 31 (namely, the surface on the Y-axis forward direction side and the surface on the Y-axis backward direction side). The second cover 20 includes a protrusion 41. The protrusion 41 is disposed on the outer surface of the second cover 20 and protrudes in the Z-axis backward direction illustrated in FIG. 10B. The protrusion 41 includes a through hole 42. The through hole 42 is for a bar-shaped fixture 40B to pass through.

The second cover 20 may be any of the types illustrated in FIGS. 2A to 9E. In a possible embodiment, the second cover 20 is of the type illustrated in FIG. 3, and the through hole 22a illustrated in FIG. 3 serves the purpose of the through hole 42 illustrated in FIG. 10B.

As illustrated in FIG. 10B, the second cover 20 is mounted onto the corresponding cable 100, and the bar-shaped fixture 40B is passed through the through holes 34 of the frame 31 and the through holes 42 of the second covers 20. In this manner, the cables 100 constituting one row (that is, three cables 100 arranged in the Y axis direction) are fixed to the partition 30. This procedure is repeated until a total of nine cables 100 constituting the three rows are fixed to the partition 30.

In the embodiment of FIG. 10B, the three cables 100 constituting one row are collectively fixed to the fixture 40B. In another possible embodiment, three cables 100 constituting one column are collectively fixed to the fixture 40B. In this case, the through holes 34 of the frame 31 are formed on the opposite surfaces in the Z-axis direction of the frame 31, namely, the Z-axis forward direction surface of the frame 31 and the Z-axis backward direction surface of the frame 31. Also in this case, each second cover 20 is fixed to the frame 31 with the second cover 20 in the posture illustrated in FIG. 10B being turned by 90 degrees about the X axis in the Y-axis forward direction or the Y-axis backward direction.

In the embodiment of FIG. 10B, the second cover 20 of each cable 100 is independent of the second covers 20 of the other cables 100. In another possible embodiment, the second covers 20 of the cables 100 constituting the three-row by three-column matrix are integral to each other. In still another possible embodiment, the second covers 20 of the cables 100 constituting one row or one column are integral to each other.

By referring to FIGS. 10C and 10D, description will be made with regard to a fixation mode in which the cables 100 are fixed to the partition 30 using a fixture that covers the second cover 20.

FIG. 10C illustrates a fixation mode in which the second cover 20 of each cable 100 is covered with a fixture 40C, and the fixture 40C is fixed to the partition 30 using a bar-shaped fixture 40D. In FIG. 10C, the cable 100 located at the second row and the third column (the second row counted in the Z-axis backward direction and the third column counted in the Y-axis backward direction) is in a state in which the second cover 20 is yet to be covered with the fixture 40C. In the actual fixation work, after the fixture 40C is mounted over the second cover 20, the bar-shaped fixture 40D is fixed to the frame 31 of the partition 30.

As illustrated in FIG. 10C, the second cover 20 of each cable 100 is covered with the fixture 40C. The fixture 40C includes a flange 40C1 and a hollow cylindrical member 40C2. The flange 40C 1 is disposed at the base end (in the X-axis backward direction) of the hollow cylindrical member 40C2. The member 40C2 has an inner diameter larger than the diameter of the electric wire group 2 (see FIG. 1A) and smaller than the diameter of the outer cover 5. This configuration ensures that when the fixture 40C covers the second cover 20 from the X-axis forward direction side of the second cover 20, the second cover 20 is prevented from moving in the X-axis forward direction.

After fixtures 40C are mounted on cables 100 constituting one row (that is, three cables 100 arranged in the Y axis direction), these cables 100 are collectively fixed to the frame 31 using bar-shaped fixtures 40D. In this respect, the fixtures 40D are arranged to keep the brims 40C1 of the fixtures 40C within the frame 31. The fixtures 40D are fixed to the frame 31 using the bolts 302. This procedure is repeated until a total of nine cables 100 constituting the three rows are fixed to the partition 30.

In another possible embodiment, the fixtures 40C constituting the three-row by three-column matrix illustrated in FIG. 10C are integral to each other. This possible embodiment is illustrated in FIG. 10D, where the fixtures 40C (see FIG. 10C) of nine cables 100 are integral to each other.

As illustrated in FIG. 10D, an integral fixture 40E includes a planar member 40E1 and nine hollow cylindrical members 40E2 (corresponding to the members 40C2 illustrated in FIG. 10C). The nine hollow cylindrical members 40E2 constitute the three-row by three-column matrix. The planar member 40E1 connects the nine hollow cylindrical members 40E2 to each other. In other words, the planar member 40E 1 is equivalent to the structure that adjacent flanges 40C1 illustrated in FIG. 10C are extended toward each other and connected to each other. The nine cables 100 covered with the fixture 40E are collectively fixed to the frame 31 using the bolts 302 and other tools.

In the embodiments of FIGS. 10A to 10C, a total of nine cables 100 constituting the three-row by three-column matrix are collectively fixed to the partition 30. In another possible embodiment, the number of cables 100 fixed to the partition 30 is other than nine and equivalent to or more than one. That is, the number of rows and the number of columns may be equivalent to or more than one.

Figure 11:
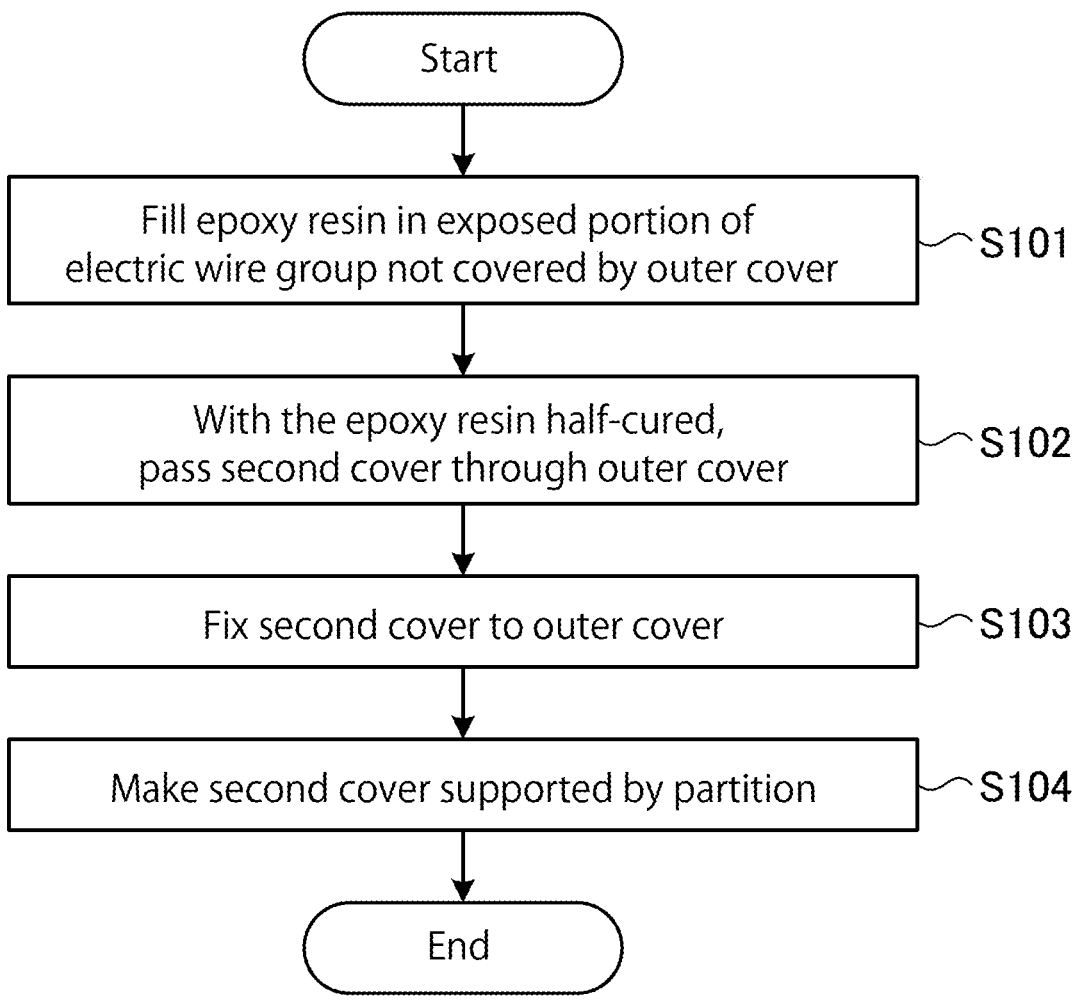
FIG. 11 is a flowchart of a procedure for wiring of a cable.

By referring to FIG. 11, a procedure for wiring of the cable 100 will be described. FIG. 11 is a flowchart of a procedure for wiring of the cable 100. As specified in FIG. 11, in the cable 100, epoxy resin is filled in the exposed portion of the electric wire group 2 not covered by the outer cover 5 (step S101). Next, with the epoxy resin half-cured, the second cover 20 is passed through the outer cover 5 (step S102). The epoxy resin filled in the exposed portion of the electric wire group 2 corresponds to the first cover 10.

Then, the second cover 20 is moved to a position suitable for the second cover 20 to cover the first cover 10, and the second cover 20 is fixed to the outer cover 5 (step S103). In this respect, the pressure portion 22 illustrated in FIG. 2A or other drawing is used for the fixing. In another possible embodiment, no pressure portion 22 is used, and the curing of the first cover 10 serves the purpose of the pressure portion 22. Next, the outer cover 5 of the cable 100 with the first cover 10 and the second cover 20 on is supported by the partition 30 (step S104), and the wiring processing ends.

In another possible embodiment, a step associated with formation of the first cover 10 may be inserted between step S103 and step S104 illustrated in FIG. 11. Examples of the step associated with formation of the first cover 10 include, but are not limited to, removing epoxy resin protruding from the second cover 20, and injecting additional epoxy resin into the space between the second cover 20 and the outer cover 5.

Figure 12:
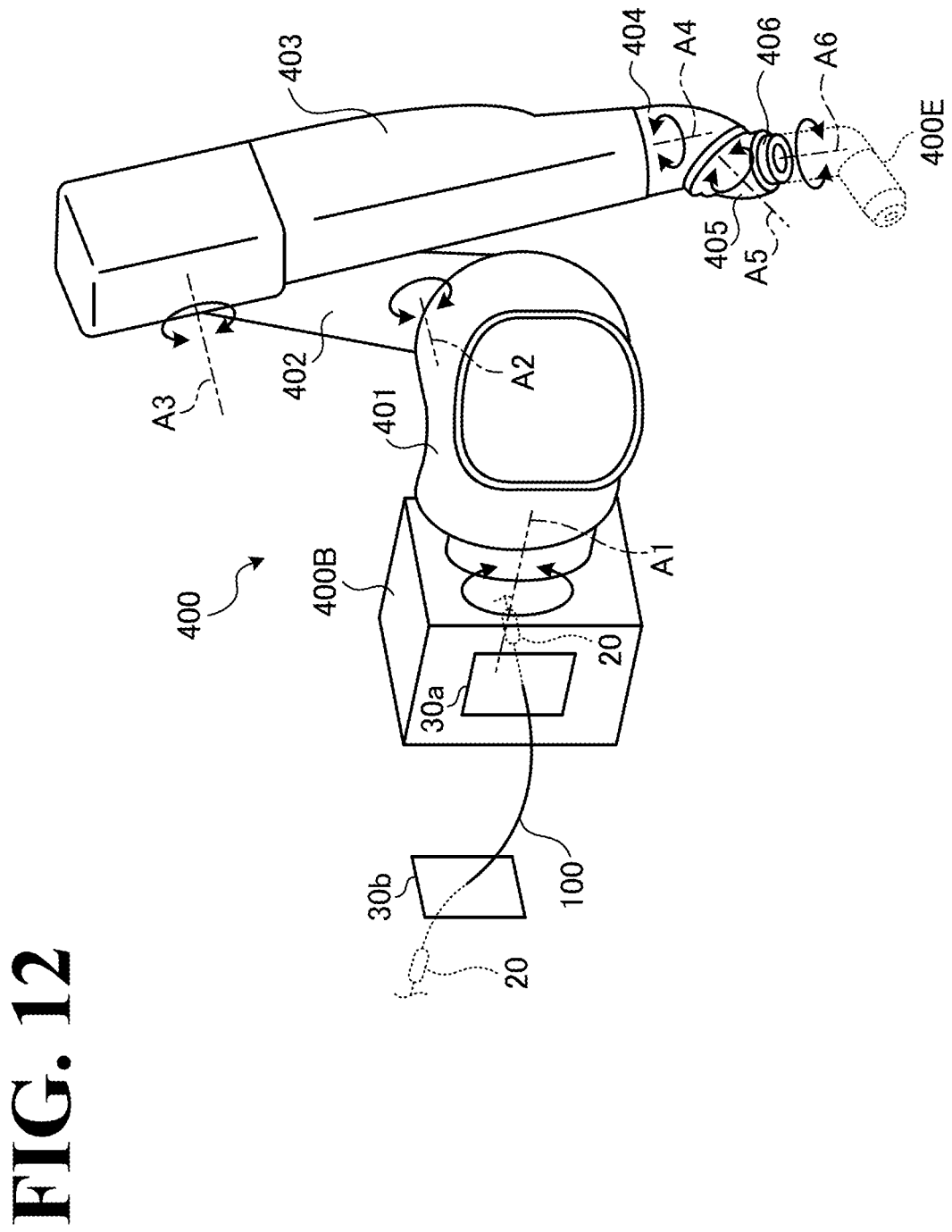
FIG. 12 is a schematic illustrating an exemplary explosion-proof system.

By referring to FIG. 12, an exemplary explosion-proof system will be described. FIG. 12 is a schematic illustrating an exemplary explosion-proof system. As illustrated in FIG. 12, the above-described cable 100 is applied to a coating robot 400, which is an exemplary explosion-proof machine. Other examples of explosion-proof machines to which the cable 100 is applicable include, but are not limited to, controllers, control panels, handling robots, and conveyance systems.

As illustrated in FIG. 12, the partition 30 (see, for example, FIG. 10A) includes a partition 30a and a partition 30b. The partition 30a is disposed on an outer wall of a base 400B of the coating robot 400. The partition 30b is disposed on an outer wall of the coating booth.

For illustration purposes, FIG. 12 illustrates a single cable 100 passing through the partitions 30a and 30b. This, however, should not be construed as limiting the number of cables 100. For example, nine cables 100 as illustrated in FIGS. 10A to 10D or any other number of cables 100 more than one may pass through the partitions 30a and 30b.

In the embodiment of FIG. 12, the inside of the coating robot 400 and the outside of the coating booth correspond to the non-explosive atmosphere NEA (see, for example, FIG. 1A), and the outside of the coating robot 400 and the inside of the coating booth correspond to the explosive atmosphere EA.

That is, in the wiring of the cable 100 illustrated in FIG. 12, the cable 100 is passed through a non-explosive atmosphere NEA, an explosive atmosphere EA, and a non-explosive atmosphere NEA, in this order. In FIG. 12, the cable 100 and the second cover 20 are illustrated in broken lines in the inside of the coating robot 400 and the outside of the coating booth.

First, the coating robot 400 will be described. The coating robot 400 is a six-axis robot, which has six rotation axes, namely, a first axis A1, a second axis A2, a third axis A3, a fourth axis A4, a fifth axis A5, and a sixth axis A6.

The coating robot 400 has a joint for each axis. The joint is driven by an actuator (not illustrated) to cause a corresponding arm to swing and/or turn. In this manner, the coating robot 400 changes its posture. The six-axis robot illustrated in FIG. 12 is an example of the coating robot 400, which may have other than six axes in other embodiments.

The coating robot 400 includes, in increasing order of distance from the base end, the base 400B, a first arm 401, a second arm 402, a third arm 403, a fourth arm 404, a fifth arm 405, and a sixth arm 406.

The coating robot 400 is connected with a hose (not illustrated) through which nonflammable gas such as nitrogen is supplied inside the coating robot 400. The introduction of gas makes the coating robot 400 positively pressured and eliminates or minimizes inflowing of flammable gas inside the coating robot 400.

The base 400B is fixed to another member or element such as an outer wall of the coating booth (not illustrated). As illustrated in FIG. 12, the base 400B has a rectangular parallelepiped shape, having six surfaces. On one of the six surfaces, the first arm 401 is disposed, and any one of the other five surfaces is fixed to a receiving surface of the above-described another member or element. Thus, the base 400B enables the coating robot 400 to be installed at any desired position.

The first arm 401, at its base end, is supported by the base 400B while being turnable about the first axis A1. The second arm 402, at its base end, is supported by the leading end of the first arm 401 while being turnable about the second axis A2, which is approximately perpendicular to the first axis A1. The third arm 403, at its base end, is supported by the leading end of the second arm 402 while being turnable about the third axis A3, which is approximately parallel to the second axis A2.

The fourth arm 404, at its base end, is supported by the leading end of the third arm 403 while being turnable about the fourth axis A4, which is approximately perpendicular to the third axis A3. The fifth arm 405, at its base end, is supported by the leading end of the fourth arm 404 while being turnable about the fifth axis A5, which crosses the fourth axis A4 at a predetermined angle. The sixth arm 406, at its base end, is supported by the leading end of the fifth arm 405 while being turnable about the sixth axis A6, which crosses the fifth axis A5 at a predetermined angle.

An end effector 400E (indicated by broken lines in FIG. 12) is attachable and detachable to and from the sixth arm 406, which is at the leading end of the coating robot 400. A non-limiting example of the end effector 400E is a coating gun. The coating robot 400 has an internal space through which cables and/or tubes connected to the end effector 400E are passed, without exposure to the outside environment.

As has been described hereinbefore, the cable 100 according to this embodiment includes the plurality of electric wires 1 and the outer cover 5. Each of the plurality of electric wires 1 includes a conductive core covered with an insulator. The outer cover 5 covers the electric wire group 2, which includes the plurality of electric wires 1. The outer cover 5 extends across the explosive atmosphere EA and the non-explosive atmosphere NEA, and is supported by the partition 30, which partitions the explosive atmosphere EA and the non-explosive atmosphere NEA from each other. The outer cover 5 includes a second-atmosphere portion disposed in the non-explosive atmosphere NEA. The second-atmosphere portion includes the first cover 10 and the second cover 2. The first cover 10 covers the exposed portion of the electric wire group 2 not covered by the outer cover 5, and is made of a thermosetting resin. The second cover 20 covers the first cover 10 and is made of a material higher in fracture strength than the thermosetting resin. A non-limiting example of the material is a metal.

The explosion-proof system according to this embodiment includes an explosion-proof machine and the cable 100. The inside of the explosion-proof machine is the non-explosive atmosphere NEA implemented by a gas introduced inside the explosion-proof machine. The cable 100 is passed through the explosion-proof machine with the partition 30 being mounted on an outer wall of the explosion-proof machine to partition the non-explosive atmosphere NEA inside the explosion-proof machine from the explosive atmosphere EA.

Thus, the first cover 10, which is made of a thermosetting resin, is covered with the second cover 20, which is made of a material such as a metal. This simple configuration increases the reliability with which a fire is prevented from spreading, and increases the working efficiency with which the cable 100 is wired on-site. Also in this embodiment, the partition 30, the first cover 10, and the second cover 20 are separate, independent elements. This configuration makes the first cover 10 and the second cover 20 smaller in size, resulting in improved space efficiency.

In the above-described embodiment, the pressure portion 22 is disposed at one end of the through portion 21 of the second cover 20. In another possible embodiment, the pressure portion 22 is disposed at each of two ends of the through portion 21. In still another possible embodiment, the through portion 21 and the pressure portion 22 partially overlap.

In the above-described embodiment, the bolts 302 are used to connect a plurality of parts and/or elements to each other. In another possible embodiment, rivets, pins, and/or other fastening members are used. In still another possible embodiment, a plurality of parts and/or elements are connected to each other by adhesion or pressure.

In the above-described embodiment, the plurality of electric wires 1 covered with the outer cover 5 are straight shaped. In another possible embodiment, at least one of the plurality of electric wires 1 is spiral shaped. Thus, the electric wires 1 covered with the outer cover 5 may take any shape.

In the above-described embodiment, the cable 100 extends across the explosive atmosphere EA and the non-explosive atmosphere NEA. This manner of wiring, however, is not intended in a limiting sense. Also in the above-described embodiment, the second cover 20 is higher in fracture strength than the first cover 10. This relationship in fracture strength, however, is not intended in a limiting sense; any other relationship in fracture strength is possible insofar as the cable 100 has such a configuration that the outer surface of the outer cover 5 is supported by a support member such as the partition 30 with a thermosetting resin covering the exposed portion of the electric wire group 2 not covered by the outer cover 5 and with a material such as a metal covering the thermosetting resin. Even with this configuration, a fire is prevented from spreading and damage is eliminated or minimized at the same time.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A cable comprising:
   electric wires each of which includes a conductive core and an insulator covering the conductive core;
   an outer cover covering the electric wires and extending from a first atmosphere to a second atmosphere less explosive than the first atmosphere, an outer surface of the outer cover being supported by a partition separating the first atmosphere from the second atmosphere;
   a first cover comprising a thermosetting resin and covering an exposed portion of the electric wires, which is not covered by the outer cover in the second atmosphere; and
   a second cover covering the first cover and comprising a material higher in fracture strength than the thermosetting resin.

2. The cable according to claim 1, wherein the thermosetting resin of the first cover comprises an epoxy resin.

3. The cable according to claim 1, wherein the second cover comprises
   a through portion through which the electric wires and the outer cover are passed, and
   a pressure portion pressing an outer surface of the outer cover.

4. The cable according to claim 1, wherein the second cover comprises at least one of a depression and a protrusion on an inner surface of the second cover, the at least one of the depression and the protrusion being in contact with the first cover.

5. The cable according to claim 1, wherein the exposed portion of the electric wires covered by the first cover is located at an end portion of the outer cover and/or at an intermediate portion of the outer cover.

6. The cable according to claim 1, wherein the second cover is fixed to the partition.

7. The cable according to claim 1, wherein the second cover is integral to another second cover of another cable.

8. An explosion-proof system comprising:
   a cable comprising:
      electric wires each of which comprising a conductive core and an insulator covering the conductive core;
      an outer cover covering the electric wires, the outer cover extending from a first atmosphere to a second atmosphere less explosive than the first atmosphere; and
      a partition supporting an outer surface of the outer cover and separating the first atmosphere from the second atmosphere;
      a first cover comprising a thermosetting resin and covering an exposed portion of the electric wires not covered by the outer cover; and
      a second cover covering the first cover and comprising a material higher in fracture strength than the thermosetting resin; and
   an explosion-proof machine which comprises the second atmosphere inside the explosion-proof machine and through which the cable is passed via the partition to separate the second atmosphere inside the explosion-proof machine from the first atmosphere.

9. The explosion-proof system according to claim 8, wherein the explosion-proof machine comprises a coating robot.

10. A cable comprising:
    electric wires each of which comprising a conductive core and an insulator covering the conductive core;
    an outer cover covering the electric wires, the outer cover being supported by a support;
    a thermosetting resin covering an exposed portion of the electric wires not covered by the outer cover; and
    a metal covering the thermosetting resin.

11. The cable according to claim 2, wherein the second cover comprises
    a through portion through which the electric wires and the outer cover are passed, and
    a pressure portion pressing an outer surface of the outer cover.

12. The cable according to claim 2, wherein the second cover comprises at least one of a depression and a protrusion on an inner surface of the second cover, the at least one of the depression and the protrusion being in contact with the first cover.

13. The cable according to claim 3, wherein the second cover comprises at least one of a depression and a protrusion on an inner surface of the second cover, the at least one of the depression and the protrusion being in contact with the first cover.

14. The cable according to claim 11, wherein the second cover comprises at least one of a depression and a protrusion on an inner surface of the second cover, the at least one of the depression and the protrusion being in contact with the first cover.

15. The cable according to claim 2, wherein the exposed portion of the electric wires covered by the first cover is located at an end portion of the outer cover and/or at an intermediate portion of the outer cover.

16. The cable according to claim 3, wherein the exposed portion of the electric wires covered by the first cover is located at an end portion of the outer cover and/or at an intermediate portion of the outer cover.

17. The cable according to claim 4, wherein the exposed portion of the electric wires covered by the first cover is located at an end portion of the outer cover and/or at an intermediate portion of the outer cover.

18. The cable according to claim 11, wherein the exposed portion of the electric wires covered by the first cover is located at an end portion of the outer cover and/or at an intermediate portion of the outer cover.

19. The cable according to claim 12, wherein the exposed portion of the electric wires covered by the first cover is located at an end portion of the outer cover and/or at an intermediate portion of the outer cover.

20. The cable according to claim 13, wherein the exposed portion of the electric wires covered by the first cover is located at an end portion of the outer cover and/or at an intermediate portion of the outer cover.

* * * * *